US011925866B1

(12) United States Patent
Adams et al.

(10) Patent No.: US 11,925,866 B1
(45) Date of Patent: Mar. 12, 2024

(54) TECHNIQUES FOR MODIFYING NETWORK APPLICATIONS

(71) Applicant: Amazon Technologies, Inc., Seattle, WA (US)

(72) Inventors: Matt Adams, Seattle, WA (US); Ryan Panella, Lake Forest, CA (US); Samuel Arthur Sidney Bartlett, Seattle, WA (US); Onur Bulut, Lake Forest, CA (US); Robin Andrew Boaz, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 17/530,109

(22) Filed: Nov. 18, 2021

(51) Int. Cl.
| | | |
|---|---|---|
| A63F 13/77 | (2014.01) | |
| A63F 13/235 | (2014.01) | |
| A63F 13/48 | (2014.01) | |
| A63F 13/63 | (2014.01) | |
| A63F 13/79 | (2014.01) | |
| H04L 67/131 | (2022.01) | |

(52) U.S. Cl.
CPC ............ *A63F 13/63* (2014.09); *A63F 13/235* (2014.09); *A63F 13/48* (2014.09); *A63F 13/77* (2014.09); *A63F 13/79* (2014.09); *H04L 67/131* (2022.05); *A63F 2300/1031* (2013.01); *A63F 2300/5546* (2013.01); *A63F 2300/6018* (2013.01)

(58) Field of Classification Search
CPC .................................. A63F 13/63; A63F 13/77
See application file for complete search history.

(56) References Cited

U.S. PATENT DOCUMENTS

| 7,867,094 B1 * | 1/2011 | Wisdom ................. A63F 13/63 |
| | | 463/43 |
| 9,251,603 B1 * | 2/2016 | Kozko .................... G06T 15/20 |
| 2002/0078203 A1 * | 6/2002 | Greschler .............. H04L 67/10 |
| | | 709/225 |
| 2006/0223600 A1 * | 10/2006 | Wisdom ................. A63F 13/12 |
| | | 463/1 |
| 2012/0115597 A1 * | 5/2012 | Waugaman ............ A63F 13/31 |
| | | 463/31 |
| 2013/0303244 A1 * | 11/2013 | Jensen ................... A63F 13/63 |
| | | 463/1 |
| 2019/0308104 A1 * | 10/2019 | Nicolades .............. A63F 13/35 |
| 2020/0139248 A1 * | 5/2020 | Sefcik .................... A63F 13/60 |
| 2020/0306639 A1 * | 10/2020 | Karlsson ................ G06F 9/451 |

* cited by examiner

Primary Examiner — Jay Trent Liddle
(74) Attorney, Agent, or Firm — Lee & Hayes P.C.

(57) ABSTRACT

This disclosure describes, in part, techniques for modifying network applications. For instance, remote system(s) may store an application on a first virtual storage device and store a modification for the application on a second virtual storage device. The remote system(s) may then install the application on a virtual server using the first virtual storage device. Additionally, the remote system(s) may receive a request to access the application along with an indication to enable the modification for the application. Based on the request, the remote system(s) may modify the application on the virtual server using the second virtual storage device. The remote system(s) may then launch the application, as modified, on the virtual server. Once the application is launched, the system(s) may provide the application to a user device using the virtual server.

20 Claims, 12 Drawing Sheets

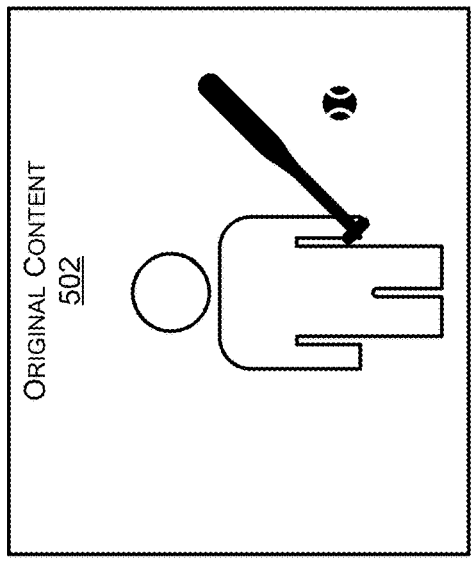
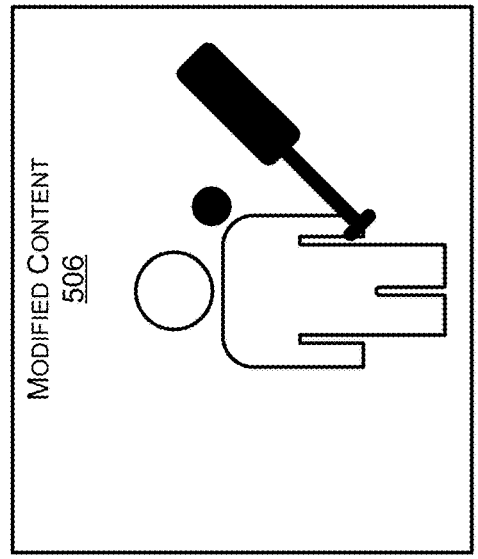
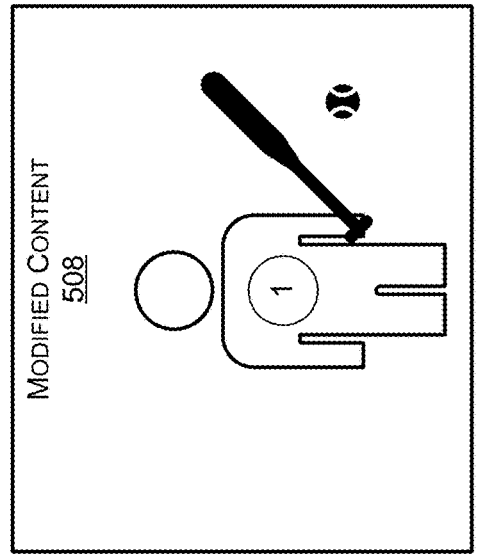
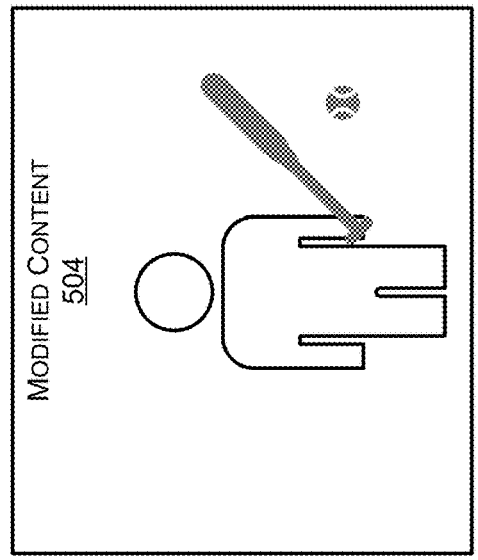
FIG. 5

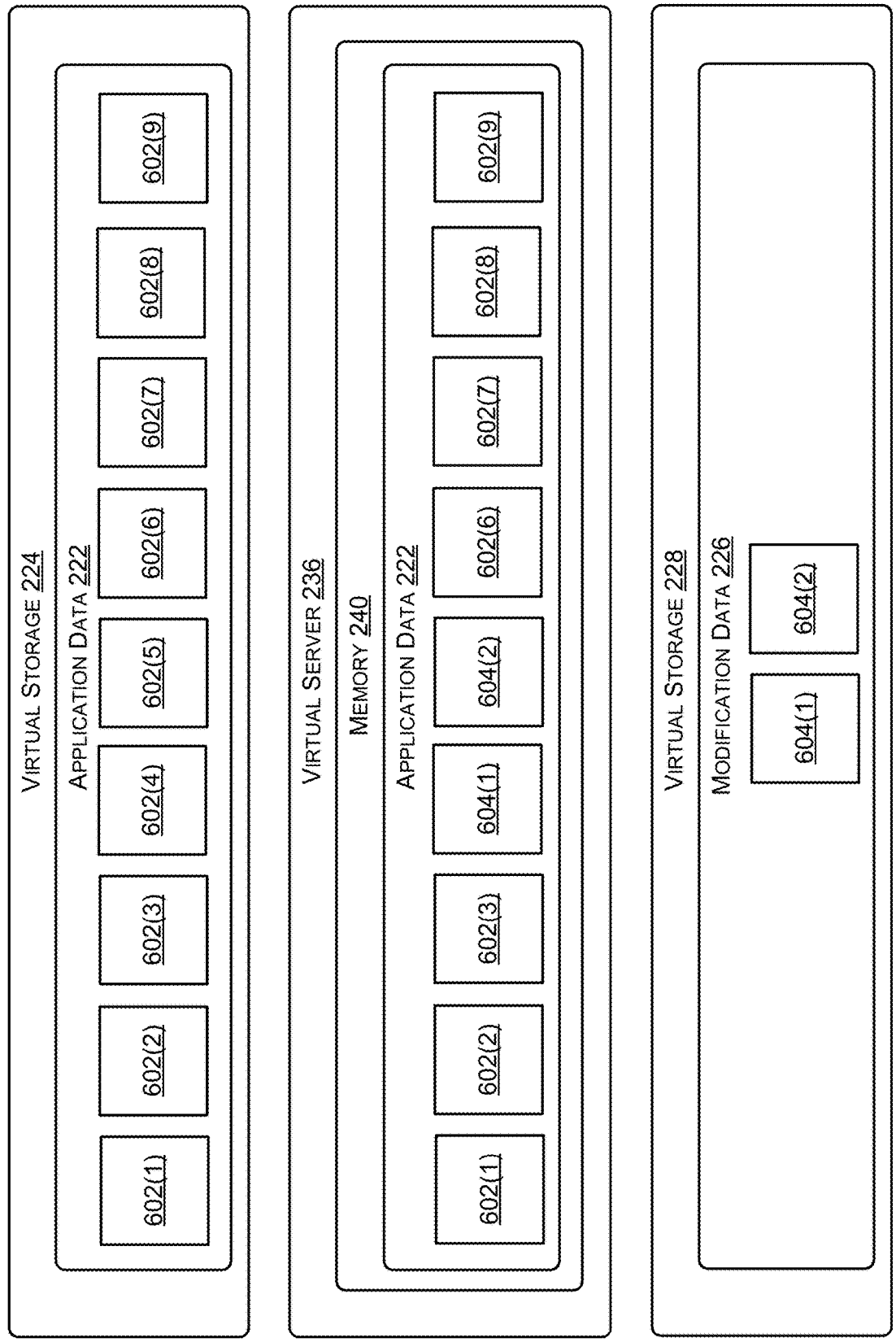

TECHNIQUES FOR MODIFYING NETWORK APPLICATIONS

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. In some circumstances, users may want to modify the game, such as by changing one or more aspects of the game. For example, the users may want to change an appearance of a character, an item used by the character, an attribute of the character, and/or so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates examples of modifying an aspect of an application, in accordance with examples of the present disclosure.

FIG. 6A illustrates an example of modifying, on a virtual server, software associated with an application, in accordance with examples of the present disclosure.

DETAILED DESCRIPTION

Figure 1:
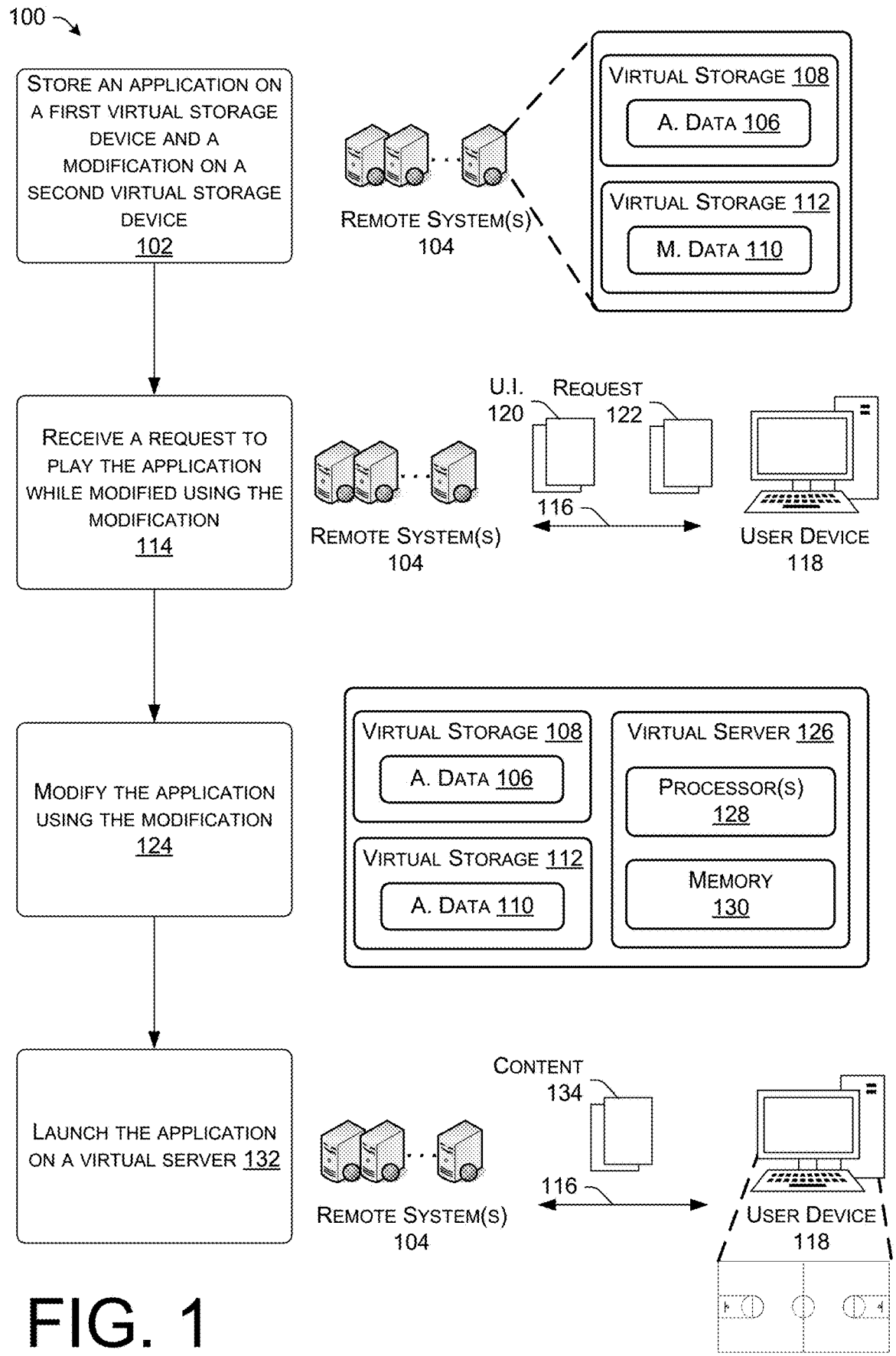
FIG. 1 illustrates an example process for providing a modified application, in accordance with examples of the present disclosure.

This disclosure describes, in part, techniques for modifying network applications. For instance, remote system(s) may store data (referred to, in some examples, as "first data") representing an application and data (referred to, in some examples, as "second data") representing a modification for the application. The remote system(s) may then receive, from a user, (1) a request to access the network application and (2) a request to modify the application using the modification. As such, the remote system(s) may associate the first data representing the application with a virtual server. The remote system(s) may then use the second data to modify the application. After modifying the application, the remote system(s) may launch the application on the virtual server for the user device. Once the application is launched, the remote system(s) (e.g., the virtual server) may provide the application to the user device. For example, the remote system(s) may receive input data the user device, update states of the application using the input data, and then send content representing the states of the back to the user device (and/or a separate display device).

For more detail, the remote system(s) may initially store the first data representing the application. As described herein, an application may include, but is not limited to, a gaming application, a word processing application, an educational application, a multimedia application (e.g., movie, music, etc.), and/or any other type of application that is capable of being accessed via a network. Additionally, the first data may include, but is not limited to, files, software, registry keys, directories, services, scripts, protection software, programs, shader cache, and/or other resources associated with the application. In some examples, the remote system(s) store the first data on a virtual storage device (referred to, in some examples, as a "first virtual storage device"). As described herein, a virtual storage device may include a storage volume, such as an Elastic Block Store (EBS), that is stored remotely (e.g., a cloud-based storage) from user devices.

The remote system(s) may also store the second data representing the modification for the application. As described herein, the second data may include, but is not limited to, files, software, scripts, shader cache, and/or any other resources associated with the modification. In some examples, the second data may be configured to modify at least a portion of the first data in order to cause the application to perform a function for which the application was not originally intended when developed. For example, if the application includes a gaming application, the modification may be configured to alter one or more aspects of the gaming application. As described herein, an aspect may include, but is not limited to, an object (e.g., a character, an item, a vehicle, a structure, a scene, etc.), an object accessory (e.g., clothing, etc.), an object's behavior (e.g., an attribute of the object, such as a speed of a character, skills of the character, etc.), an environment (e.g., a level, a structure, etc.), output audio (e.g., sounds objects make), a difficulty of the gaming application, and/or any other aspect. For another example, and again if the application includes a gaming application, the modification may be configured to add one or more aspects to the gaming application (e.g., add a new character, object, environment, etc.). As such, the modifications may include, but are not limited to, aesthetics modifications, gameplay modifications, content modifications, technical modifications, and/or any other type of modifications.

For a first example, and if the application includes a gaming application, a first aspect of the application may include a main character of the gaming application. A first modification may then change the main character of the application to a new character. For a second example, and again if the application includes a gaming application, a second aspect of the application may include an item, such as sporting equipment, used by a character. A second modification may then change the item for the character to a new item. For a third example, and again if the application includes a gaming application, a third aspect of the application may include an attribute of a character, such as a speed of the character. A third modification may then change the attribute of the character, such as by increasing the speed of the character. Still, for a fourth example, and again if the application includes a gaming application, a fourth modification may include adding a character, an object, an environment, and/or the like to the gaming application. While these are just a couple examples of aspects that may be modified and/or added based on modifications, in other examples, modifications may change and/or add additional aspects for the application.

In some examples, to store the second data, the remote system(s) store the second data on the first virtual storage device with the first data. In some examples, the remote system(s) store the second data on an additional virtual storage device (referred to, in some examples, as a "second virtual storage device") that is separate from the first virtual storage device. Still, in some examples, such as when there is more than one modification for the application, the remote system(s) may store two or more of the modifications on the first virtual storage device with the application and/or on the second virtual storage device separate from the application.

In some examples, the remote system(s) may receive the modification from a developer of the application. For example, at a time that the developer uploads the application and/or after the developer uploads the applications, the remote system(s) may receive the modification from one or more computing devices associated with the developer. Additionally, or alternatively, in some examples, the remote system(s) receive the modification from user(s) other than the developer, such as from a community of users. For example, the remote system(s) may provide a network resource, such as a web portal, that computing devices associated with users may use to upload modifications for applications. In either of the examples, the remote system(s) may receive additional data from the one or more computing devices that upload the modification. The additional data may include, but is not limited to, identifier data associated with the application, identifier data associated with the modification, a price for acquiring the modification, a list of users that are able to enable the modification, image data representing the modification, text data representing a description of the game, and/or any other information.

In some examples, the remote system(s) may initially verify that the modification is compatible for the application. For a first example, the remote system(s) may perform the processes described below in order to install, modify, and launch the application. The remote system(s) may then verify the modification when the application launches as intended, with the modification applied, or determine that the modification is not verified when the application does not launch as intended (e.g., when problems occur with the launching). For a second example, such as when the modification is received from the community of users, the remote system(s) may verify whether modifications are authorized for the application. For instance, the developer of the application may initially specify whether the remote system(s) are authorized to modify the application or whether the remote system(s) are unauthorized to modify the application.

In some examples, the remote system(s) may then add an identifier of the modification to a catalogue of modifications that are available for the application. Users of the application may then use the catalogue in order to select the modification for the application. For example, the remote system(s) may receive, from a user device, a request to play the application. Based on the request, the remote system(s) may send, to the user device, a user interface that includes at least modification(s) that are available for the application and price(s) associated with the modification(s). A user associated with the user device is then able to view the modification(s) and select at least one modification for the application. In response, the remote system(s) may receive, from the user device, a request to acquire the modification. If the modification includes a price, the remote system(s) may then process a transaction for the price of the modification. The remote system(s) may then store, in association with a user account of the user, information indicating that the user has acquired the modification (e.g., the user has permission to enable the modification).

Based on the user selecting the application and the modification for the application, the remote system(s) may then install, modify, and launch the application for the user. For example, either before the user selects the application or after the user selects the application, the remote system(s) may associate the first virtual storage device with a virtual server. As described herein, a virtual server may include a server (e.g., a computer and server programs) that executes at a remote location and is used to run applications. For example, the virtual server may include one or more dedicated computing resources, such as central processing units (CPUs), memory, storage devices, network capacity, and/or the like for running and providing the application. The remote system(s) may then associate the second virtual storage device with the virtual server. Additionally, the remote system(s) may use the second data stored on the second virtual device to modify the application. In some examples, the remote system(s) cause the modification of the application by executing a launch script represented by the second data.

In some examples, modifying the application may include at least altering the software files, the file directories, the registry keys, the services, and/or any other resource of the first data stored on the first virtual storage device. Additionally, or alternatively, in some examples, modifying the application may include installing new software files, files directories, registry keys, and/or services for the application on the first virtual storage device, where these new resources are represented by the second data. Additionally, or alternatively, in some examples, modifying the application may include updating the launch script associated with the application on the first virtual storage device, where the launch scrip represents at least rules, processes, commands, and/or the like for launching the application on the virtual server. While these are just a couple example techniques of modifying the application on the first virtual storage device, in other examples, the application may be modified using additional and/or alternative techniques.

Additionally to, or alternatively from, modifying the application on the first virtual storage device, the remote system(s) may install the application on the virtual server. In some examples, the remote system(s) install the application on the virtual server using the first virtual storage device. For instance, to install the application, the remote system(s) may use the first virtual storage device to install at least a portion of the first data on the virtual server, such as the software files, the file directories, the registry keys, the services, and/or other resources associated with the application.

The remote system(s) may then use the second data, which may again be stored on the first virtual storage device or the second virtual storage device, to modify the application on the virtual server. In some examples, modifying the application may include at least altering the software files, the file directories, the registry keys, the services, and/or any other resource of the first data stored on the virtual server. Additionally, or alternatively, in some examples, modifying the application may include installing new software files, files directories, registry keys, and/or services for the application stored on the virtual server, where these new resources are represented by the second data. Additionally, or alternatively, in some examples, modifying the application may include updating the launch script associated with the application stored on the virtual server, where the launch scrip represents at least rules, processes, commands, and/or the like for launching the application on the virtual server. While these are just a couple example techniques of modifying the application on the virtual server, in other examples, the application may be modified using additional and/or alternative techniques.

After modifying the application, the remote system(s) may cause the application to launch on the virtual server. In some examples, remote system(s) may cause the launching using the launch script (which may be modified) associated with the application. Since the modification has already been applied to the application, the application should be modified once launched. After launching the application, the remote system(s) may then provide the application to the user device using the virtual server.

For example, remote system(s) may assign the user device to the virtual server. The virtual server may then begin to send data (e.g., video data, audio data, etc.) to and/or receive data (e.g., input data) from the user device while the user device is assigned to the virtual server. For instance, the virtual server may send, to the user device, data (e.g., video data, audio data, etc.) representing a first state of the application. For example, if the application includes a gaming application, the first state of the application may include an object (e.g., a character) located at a first position within a gaming environment (e.g., a forest). In this example, if the modification includes a new object for the character, then the first state of the application may include character holding the new object. The user device may receive the data from the virtual server and, using the data, the user device may display image(s) representing the first state of the application. For example, and again if the application includes the gaming application, the user device may display content representing the object located at the first position within the gaming environment with the new object. In some instances, the user device may further output sound represented by the audio data.

The user may then use the user device and/or a separate control device to provide inputs to the network application via the virtual server. For example, the control device may receive an input, such as a selection of a button, joystick, key, touch-sensitive pad, sensor, and/or the like associated with the control device. The control device may then send, to the virtual server, data representing the input. Using the data, the virtual server may update the first state of the network application to a second state of the network application. For example, and again if the network application includes the gaming application, the input may be associated with moving the object forward by a given amount within the gaming environment. As such, the virtual server may update the first state of the of the network application to the second state of the network application by moving the object forward in the environment by the given amount.

The virtual server may then send, to the user device, data (e.g., video data, audio data, etc.) representing the second state of the application. Using the data, the user device may display image(s) representing the second state of the game. For example, the user device may display content representing the object located at the second position within the gaming environment. Additionally, in some instances, the user device may output sound represented by the audio data. The virtual server may then continue to perform similar processes to update the state of the application on the user device as the virtual server continues to receive data from the control device.

In some examples, once the user is finished with a session associated with the application, the remote system(s) may store data representing progress of the user through the application. The remote system(s) may later use this data to allow the user to resume playing the application at a similar position during a next session of the application. In some examples, the remote system(s) may further store data representing the modification that was enabled to the application during the session. This way, during the next session, the remote system(s) are also able to enable a similar modification to the application. In other words, the remote system(s) may provide the user with a similar gaming experience during a next session of the application.

While the examples above describe enabling one modification to the application, in other examples, the remote system(s) may perform similar techniques to enable multiple modifications for the application. For example, the remote system(s) may store data (referred to, in some examples, as "third data") representing a second modification for the application. As described herein, the remote system(s) may store the third data on the first virtual storage device, the second virtual storage device, or a new virtual storage device (referred to, in some examples, as a "third virtual storage device"). The remote system(s) may then perform similar processes, as those described above, to modify the application using the second modification. In some examples, the application is modified on the first virtual storage device while, in other examples, the application is installed and then modified on the virtual server. In either of the examples, by performing such processes, the remote system(s) allow the user to enable multiple modification to the application.

In some examples, when enabling more than one modification, the remote system(s) may perform one or more processes in order to verify that the modifications are compatible with one another. For an example of two modifications being incompatible, both the modification and the second modification may be associated with a similar aspect of the application. For instance, both the modification and the second modification may be associated with altering a visual aspect of a same object, such as a ball in a sports game. Since both modifications are for changing the same aspect of the application, the modifications may be incompatible with one another. This may be because both modifications attempt to alter the same portion of the first data representing the application.

The remote system(s) may thus determine that the modifications are incompatible using one or more techniques. For a first example, the remote system(s) may analyze the modifications and, based on the analysis, determine that both modifications are associated with the same aspect of the application. As such, the remote system(s) may determine that the modifications are incompatible. For a second example, the remote system(s) may have previously attempted to enable both modifications when launching the application and, based on both modifications being enabled, the launching the application may have failed. As such, the remote system(s) may again determine that the modifications are incompatible. In either of the examples, the remote system(s) may send, to the user device, a notification that the modification are incompatible. In some examples, the remote system(s) may then select one of the modifications to enable for the application. In some examples, the remote system(s) may select the modification based on receiving, from the user device, input data representing a selection of the modification.

Additionally, while the examples above describe modifying a single instance of the application on a single virtual server, in some examples, the remote system(s) may perform similar processes to modify the application on multiple virtual servers for multiple users. For example, the remote system(s) may take a point-in-time copy, such as a snapshot, of the state of the first virtual storage device. For example, the point-in-time copy may include the information (e.g., the first data) that is required to again store the application on one or more first virtual storage devices. The remote system(s) may then perform similar processes to take a point-in-time copy of the state of the second storage device. For example, the point-in-time copy may include the information (e.g., the second data) that is required to again store the modification on one or more second virtual storage devices.

The remote system(s) may then be configured to use the first virtual storage devices that store the application as well as the second virtual storage devices that store the modification to launch the application, as modified, on multiple virtual servers. For example, the remote system(s) may initially associate the first virtual storage devices that store the application with the virtual servers. As the remote system(s) receive requests to play the application, where the requests also indicated the modification, the remote system(s) are then able to modify the applications, either on the first virtual storage device or on the virtual servers, using the second virtual storage devices that store the modification, using the processes described herein. After modifying each instance of the application on a respective virtual server, the remote system(s) may then launch the application on the virtual server in order to provide the application to a respective user device. This way, the remote system(s) are able to quickly launch multiple instances of the application, which are modified with the same modification, for multiple users.

Additionally, the remote system(s) are able to use the first virtual storage devices to modify the application using different modifications for different virtual servers. For example, the remote system(s) may again associate the first virtual storage devices that store the application on the multiple virtual servers. The remote system(s) may then use different second virtual storage devices, that store different modifications, to modify the application differently on the virtual servers. For example, the remote system(s) may use the second virtual storage device to modify a first instance of the application on a first virtual server using the modification and use the third virtual storage device to modify a second instance of the application on a second virtual server using the second modification. This way, the remote system(s) are able to modify the application for each user based on each user's preference for modification.

By performing the processes described herein, the remote system(s) are able to modify applications for users. As such, users are not required to download the modification associated with the application and then manually modify the application using the modification. Such processes may be difficult to perform for users, and mistakes made by the users may cause problems to occur with the application. In contrast, rather than manually modifying the application, the users may just need to select the application and the modification to enable for the application. The remote system(s) may then perform all of the processes needed to modify the application for the users.

As described herein, a virtual storage device may include a storage volume, such as an EBS, that is stored remotely (e.g., a cloud-based storage) from user devices. In some examples, the remote system(s) may generate different types of virtual storage devices. For example, the remote system(s) may generate solid-state drives, hard disk drive, and/or any other type of remote storage drives. After the remote system(s) generate the virtual storage device, users can cause the remote system(s) to create a file system on the virtual storage device, run a database on the virtual storage device, store an application on the virtual storage device, and/or perform one or more additional and/or alternative processes with the virtual storage device. For example, a first developer may use the first virtual storage device to store the application and a second developer may use the second virtual storage device to store the modification.

As described herein, a file may include, but is not limited to, a JavaScript Object Notation (JSON) file, a Batch file, a Hypertext Markup Language (HTML) file, an Extensible Markup Language (XML) file, an executable (EXE) file, a log file, a zip file, and/or any other file format type. For example, an events file, a registry file, and a service file may each include a first file format type, such as JSON, while an install file and a launch file each include a second file format type, such as BAT. Additionally, as described herein, an identifier may include, but is not limited to, a numerical identifier, an alphabetic identifier, a mixed numerical and alphabetic identifier, a code, and/or any other type of identifier that may be used to identify an application, a modification, a user account, a device, and/or the like.

As further described herein, the remote system(s) may associate a virtual storage device with a virtual server. In some examples, associating the virtual storage device with the virtual server may correspond go the remote system(s) "attaching" the virtual storage device to the virtual server. In some examples, associating the virtual storage device with the virtual server may cause at least some of the data stored on the virtual storage device to be installed onto the virtual server. In some examples, associating the virtual storage device with the virtual server may cause other data, such as links, pointers, indicators, files, and/or the like, that is associated with the data stored on the virtual storage device to be generated and then installed onto the virtual server.

FIG. 1 illustrates an example process 100 for providing a modified application, in accordance with examples of the present disclosure. At 102, the process 100 may include storing an application on a first virtual storage device and a modification on a second virtual storage device. For instance, remote system(s) 104 may store application data 106 representing the application on a first virtual storage device 108. In some examples, the application may include a gaming application. The remote system(s) 104 may also store modification data 110 representing the modification on a second virtual storage device 112. In some examples, such as when the application includes the gaming application, the modification may modify an aspect of the gaming application, such as an object, an object accessory, an object's behavior, an environment, output audio, and/or any other aspect. In some examples, and again when the application includes the gaming application, the modification may add an aspect to the gaming application. In some examples, the remote system(s) may store more than one modification for the application on the second virtual storage device and/or other virtual storage device(s).

At 114, the process 100 may include receiving a request to play the application while modified using the modification. For instance, the remote system(s) 104 may establish a connection 116 with a user device 118 via a wireless network. The remote system(s) 104 may then send, from the user device 118, user interface data 120 representing a user interface associated with the application. For example, the user interface may include content related to the application (an introductory image), modification(s) that are available for the application, price(s) of the modification(s), and/or any other information. A user of the user device 118 may then use the user interface to select at least the modification for the application. Based on the selection, the remote system(s) 104 may receive, from the user device 118, request data 122 representing (1) a request to play the application and (2) a request to modify the application using the modification. Based on receiving the request data 122, the remote system(s) may then perform one or more processes to determine whether to enable to modification for the user.

For example, the remote system(s) 104 may determine whether the user is authorized to enable the modification. In some examples, the remote system(s) 104 determine whether the user is authorized using account data associated with the user. For instance, the remote system(s) 104 may determine, using the account data, whether the user has already acquired the modification for the application. If the remote system(s) 104 determine that the user has already acquired the modification, then the remote system(s) 104 may determine that the user is authorized to enable the modification. However, if the remote system(s) 104 determine that the user has not already acquired the modification, then the remote system(s) 104 may processes a transaction for the modification. After processing the transaction, the remote system(s) may store, in association with the account data, data indicating that the user has acquired the modification. In some examples, the data may include at least identifier data associated with the modification.

At 124, the process 100 may include modifying the application using the modification. For instance, the remote system(s) 104 may associate the first virtual storage device 108 with a virtual server 126. As described herein, the virtual server 126 may include a server (e.g., a computer and server programs) that executes at a remote location and is used to run applications. For example, the virtual server 126 may include one or more dedicated computing resources, such as central processing units (CPUs) 128, memory 130, storage devices, network capacity, and/or the like for running and providing the application. The remote system(s) 104 may then associate the second virtual storage device 112 with the virtual server 126. The remote system(s) may then launch the modification (e.g., execute the launch script associated with the application), which may cause one or more processes to occur in order to modify the application that is associated with the virtual server 126.

For instance, and in some examples, modifying the application may include at least altering the software files, the file directories, the registry keys, the services, and/or any other resource of the first data stored on the first virtual storage device 108. Additionally, or alternatively, in some examples, modifying the application may include installing new software files, files directories, registry keys, and/or services for the application on the first virtual storage device 108, where these new resources are represented by the second data. Additionally, or alternatively, in some examples, modifying the application may include updating the launch script associated with the application on the first virtual storage device 108, where the launch scrip represents at least rules, processes, commands, and/or the like for launching the application on the virtual server. While these are just a couple example techniques of modifying the application on the first virtual storage device 108, in other examples, the application may be modified using additional and/or alternative techniques.

Additionally to, or alternatively from, modifying the application on the first virtual storage device 108, the remote system(s) 104 may initially install the application on the virtual server 126. In some examples, the remote system(s) install the application on the virtual server 126 using the first virtual storage device 108. For instance, to install the application, the remote system(s) 104 may use the first virtual storage device 108 to install at least a portion of the first data on the virtual server 126, such as the software files, the file directories, the registry keys, the services, and/or other resources associated with the application.

The remote system(s) 104 may then use the second data, which may again be stored on the second virtual storage device 112, to modify the application on the virtual server 126. In some examples, modifying the application may include at least altering the software files, the file directories, the registry keys, the services, and/or any other resource of the first data stored on the virtual server 126. Additionally, or alternatively, in some examples, modifying the application may include installing new software files, files directories, registry keys, and/or services for the application stored on the virtual server 126, where these new resources are represented by the second data. Additionally, or alternatively, in some examples, modifying the application may include updating the launch script associated with the application stored on the virtual server 126, where the launch scrip represents at least rules, processes, commands, and/or the like for launching the application on the virtual server 126. While these are just a couple example techniques of modifying the application on the virtual server 126, in other examples, the application may be modified using additional and/or alternative techniques.

At 132, the process 100 may include launching the application on the virtual server. For instance, after launching the modification (e.g., on the first virtual storage device 108 and/or on the virtual server 126), the remote system(s) 104 may then launch the application on the virtual server 126. In some examples, the remote system(s) 104 launch the application using the launch script associated with the application. Once the application is launched, the remote system(s) 104 may provide the application to the user device 118 via the virtual server 126. For example, and as shown, the virtual server 126 may receive input data from the user device 118, update states of the application using the input data, and then send content data 134 representing the states of the application back to the user device 118. In the example of FIG. 1, the application may include a gaming application, such as a sports game, where the user device 118 is outputting the content represented by the content data 134.

Figure 2:
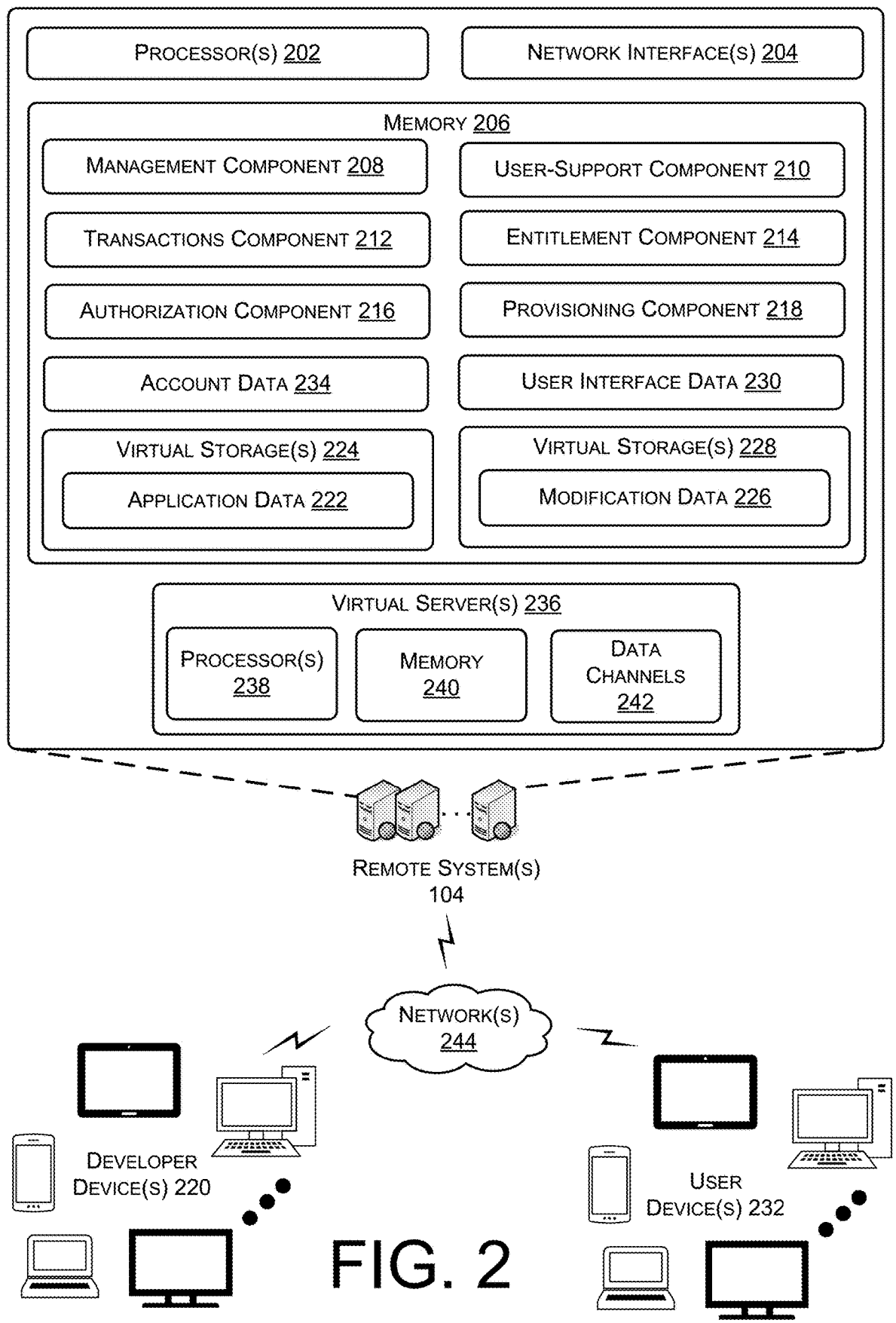
FIG. 2 illustrates a block diagram of an example architecture of remote system(s) that provide modified applications, in accordance with examples of the present disclosure.

As discussed in the example process 100, the remote system(s) 104 may be configured to provide the modified application to the user. As such, FIG. 2 illustrates a block diagram of an example architecture of the remote system(s) 104 that provide modified applications, in accordance with examples of the present disclosure. As shown, the remote system(s) 104 may include at least one or more processors 202, one or more network interfaces 204, and memory 206. Additionally, the remote system(s) 104 may store, in the memory 206, at least a management component 208, a user-support component 210, a transactions component 212, an entitlement component 214, an authorization component 216, and a provisioning component 218. However, in other examples, the remote system(s) 14 may store more or less components than the components 208-218 illustrated in the example of FIG. 2. For example, two or more of the components 208-218 may be combined into a single component.

The management component 208 may be configured to provide developers with tools to upload applications and/or modifications. For instance, the management component 208 may provide a network resource, such as a web portal, to developers so that the developers are able to upload applications and/or modifications for the applications. For example, a developer of an application may use a developer device 220 to upload application data 222 representing the application via the network resource provided by the management component 208. In some examples, once the application is uploaded, the remote system(s) 104 (and/or the management component 208) may store the application data 222 on virtual storage device(s) 224. In some examples, the remote system(s) 104 store the application data 222 on a single virtual storage device 224 while, in other examples, the remote system(s) 104 may store the application data 222 on multiple virtual storage devices 224.

For another example, a developer (e.g., the developer of the application, a user from a community of users, etc.) of a modification for the application may use a developer device 220 to upload modification data 226 representing the modification via the network resource provided by the management component 208. In some examples, once the modification is uploaded, the remote system(s) 104 (and/or the management component 208) may store the modification data 226 on virtual storage device(s) 228. In some examples, the remote system(s) 104 store the modification data 226 on a single virtual storage device 228 while, in other examples, the remote system(s) 104 may store the modification data 226 on multiple virtual storage devices 228. Still, in other examples, the remote system(s) 104 may store the modification data 226 with the application data 222 on the virtual storage device(s) 224.

In some examples, the management component 208 (and/or another component) may further be configured to verify the modification, such as when the modification is uploaded by the developer. For a first example, the management component 208 may perform the processes described herein in order to install, modify, and launch the application. The management component 208 may then verify the modification when the application launches as intended, with the modification applied, or determine that the modification is not verified when the application does not launch as intended (e.g., when problems occur with the launching). For a second example, such as when the modification is received from the community of users, the management component 208 may verify whether the modifications are authorized for the application. For instance, the developer of the application may initially specify whether the remote system(s) 104 are authorized to modify the application or whether the remote system(s) 104 are unauthorized to modify the application. As such, the remote system(s) 104 may not allow modifications for the application when the developer does not authorize the modifications.

In some examples, the developer of the modification may provide additional information via the network resource. The additional information may include, but is not limited to, an identifier associated with the application, an identifier associated with the modification, a price associated with the modification, a list of users that are able to acquire and/or enable the modification, and/or any other information. In such examples, the management component 208 may use the identifier associated with the application to identify the application for which the modification is created. The management component 208 may also use the identifier associated with the modification to create an identifier, such as a standard identifier number, for the modification. Additionally, the management component 208 may use the price when conducting transactions for users that acquire the modification.

Figure 3:
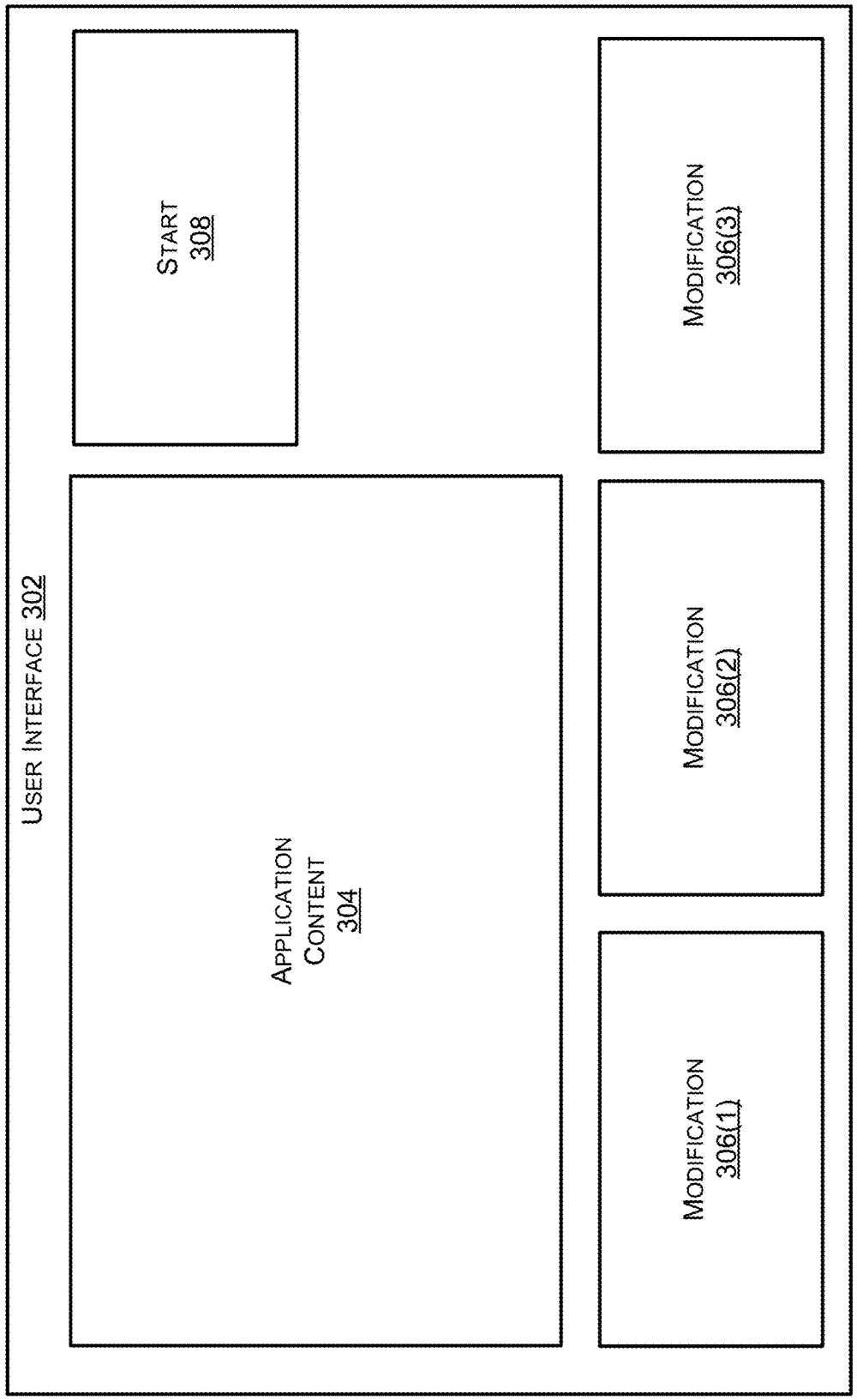
FIG. 3 illustrates an example of a user interface for selecting modifications for an application, in accordance with examples of the present disclosure.
Figure 4:
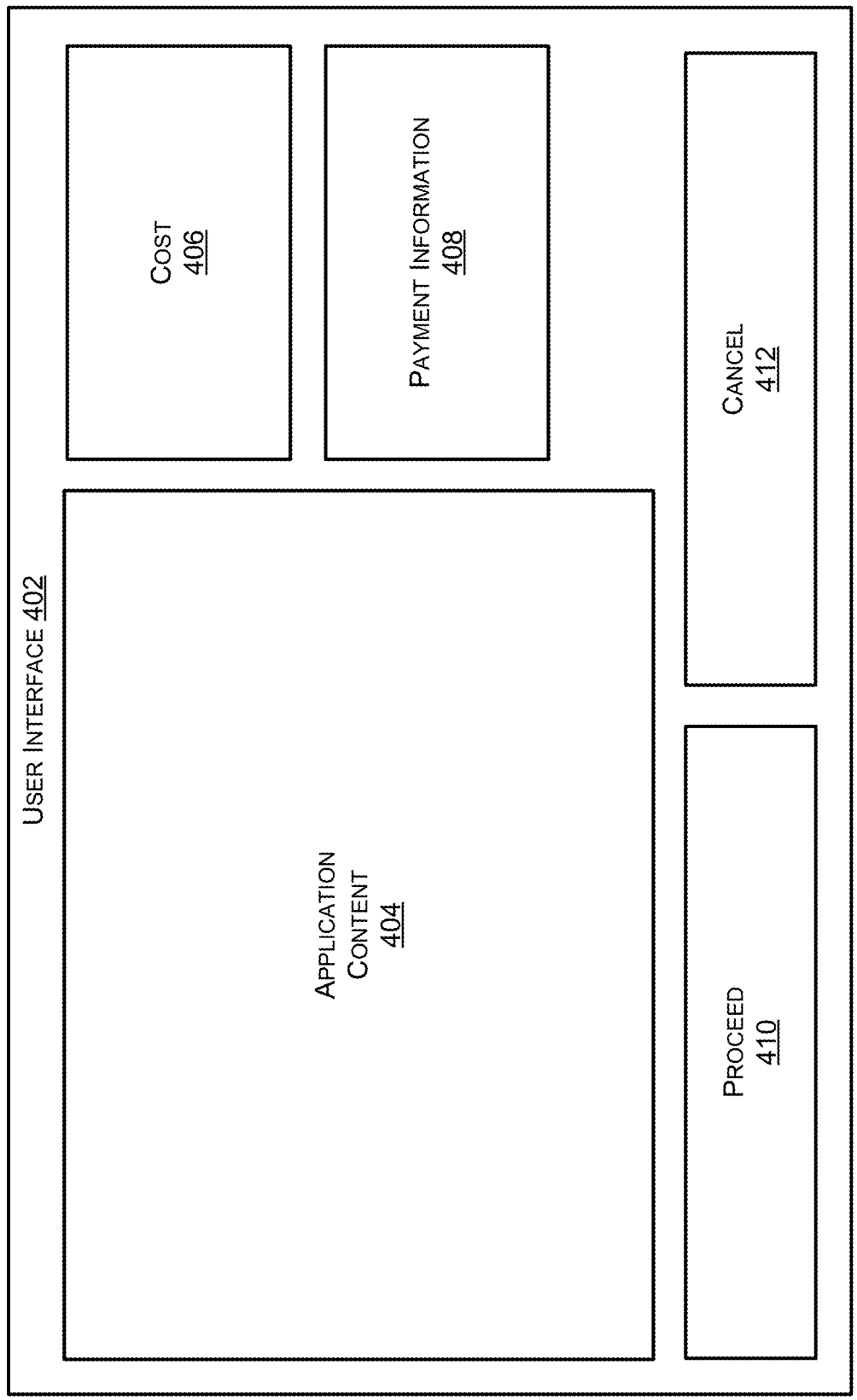
FIG. 4 illustrates an example of a user interface for acquiring a modification for an application, in accordance with examples of the present disclosure.

The user-support component 210 may be configured to provide users with support to acquire applications, acquire modifications, select applications for play, and/or select modifications to enable for the applications. For example, the user-support component 210 may generate a user interface that includes at least content related to the application (an introductory image), modification(s) that are available for the application, price(s) of the modification(s), and/or any other information (where example user interfaces are illustrated in FIGS. 3 and 4). The user-support component 210 may then cause user interface data 230, representing the user interface, to be sent to a user device 232 associated with a user. Using the user interface data 230, the user device 232 may provide the user interface to the user. The user is then able to select one or more of the modification(s) to enable for the application. Based on the selection, the user-support component 210 may receive, from the user device 232, a request to play the application and/or a request to modify the application using the modification(s).

At least some modifications may require that the user purchase the modifications before enabling the modifications for the application. As such, the transactions component 212 may be configured to process transactions for the prices of these modifications. For example, after the user selects the modification, where the modification may be purchased for a price, the transactions component 212 may be configured to process a transaction for the price of the modification. In some examples, the transactions component 212 processes the transaction using payment information (e.g., credit card information, debit card information, etc.) stored in association with account data 234, where the account data 234 represents a user account associated with the user. In some examples, the transactions component 212 may receive the payment information from the user device 232, such as at a time that the user is purchasing the modification. In either of these examples, the transactions component 212 may use the payment information to process the transaction for the price of the modification.

In some examples, the transactions component 212 (and/or one of the other components 208-218 described herein) may then store, in association with the account data 234, data (which may also be represented by the account data 234) indicating that the user is authorized to enable the modification. The data may represent at least the identifier associated with the application, the identifier associated with the modification, a date and/or time that the modification was purchased by the user, a time period that the user is able to enable the modification (e.g., if the purchase is only for the time period), and/or any other information. This way, and as discussed below, the remote system(s) 104 are able to later use the account data 234 to determine that the user is authorized to enable the modification.

The authorization component 216 may be configured to communicate with the entitlement component 214 to verify that the application is enabled for modifications. For example, after the user selects the application and the remote system(s) 104 receive the request to play the application, the authorization component 216 may send a request to the entitlement component 214. The entitlement component 214 may then perform one or more of the processes described herein in order to determine whether the application is enabled for modifications. For example, the entitlement component 214 may determine whether existing modifications exist for the application. Additionally, when the application is enabled for modifications, the entitlement component 214 may be configured to determine which modifications the user has enabled for the application. In some examples, the entitlement component 214 makes the determination based on the request received from the user device 232, where the request indicates the selected modification for enablement. The entitlement component 214 may then send, to the authorization component 216, data indicating that the application is enabled for modifications and/or data indicating the modification that the user has enabled.

In some examples, the authorization component 216 may then be configured to generate data, such as a token, representing information about the session with the user. For example, the data may represent at least an identifier of the application, identifier(s) of the modification(s) enabled for the session, an identifier about the user device 232 that is going to connect to the session, and/or any other information. The authorization component 216 may then send this data to the provisioning component 218, where the provisioning component 218 uses the data when provisioning the application for the user.

For example, the provisioning component 218 may initially be configured to create a pool of instances for the application. To create the pool of instances, the provisioning component 218 may be configured to associate the virtual storage devices 224 with virtual servers 236. As described above, a virtual server 236 may include a server (e.g., computer and server programs) that executes at a remote location, from the user devices 232, and is used to run the application. For example, the virtual servers 236 may include one or more dedicated computing resources, such as CPUs 238, memory 240, storage, network capacity, and/or the like for running and providing the application. In some examples, after the provisioning component 218 associates the virtual storage devices 224 with the virtual servers 236, the application may begin to install on the virtual servers 236. In such examples, install files represented by the application data 222 may cause the installation of the application onto the virtual servers 236.

The provisioning component 218 may then be configured to provision a session of the application for the user. For example, and using the data (e.g., the token) received from the authorization component 216, the provisioning component 218 may determine which modification (and/or modifications) are enabled for the session. The provisioning component 218 may then use one or more of the processes described herein in order to modify the application, on a virtual storage device 224 and/or on a virtual server 236, using the modification. For example, the provisioning component 218 may use the virtual storage device 228 associated with the modification to alter the software files, the file directories, the registry keys, the services, and/or any other resource of the application data 222 stored on the virtual storage device 224 and/or the virtual server 236. Additionally, or alternatively, in some examples, the provisioning component 218 may use the virtual storage device 228 to store new software files, files directories, registry keys, and/or services for the application on the virtual storage device 224 and/or on the virtual server 236, where these new resources are represented by the modification data 226. Additionally, or alternatively, in some examples, the provisioning component 218 may use the virtual storage device 228 to update the launch script associated with the application stored on the virtual storage device 224 and/or the virtual server 236, where the launch scrip represents at least rules, processes, commands, and/or the like for launching the application on the virtual server 236. While these are just a couple example techniques of the provisioning component 218 modifying the application, in other examples, the provisioning component 218 may modify the application using additional and/or alternative techniques.

Once the application is modified, the provisioning component 218 may cause the application to launch on the virtual server 236. In some examples, the provisioning component 218 causes the launching using the launch script associated with the application. The remote system(s) 104 may then establish a connection between the user device 232 that requested the application and the virtual server 236 that is executing the modified application. For example, the virtual server 236 may use data channels 242 to exchange data with the user device 232. For instance, the virtual server 236 may receive data, such as input data, from the user device 232 using first data channel(s) 242. The virtual server 236 may also send data, such as content data representing the states of the application, to the user device 232 using second data channel(s) 242.

In some examples, a developer of the application may provide updates to the application. In such examples, the remote system(s) 104 (e.g., the entitlement component 214) may determine whether the modifications are still compatible for the updated application, using one or more of the verification processes described herein. For a first example, the remote system(s) 104 may perform the processes described herein in order to install, modify, and launch the updated application with a modification. The remote system(s) 104 may then verify that the modification is still compatible for the updated application when the updated application launches as intended, or determine that the modification is not verified when the updated application does not launch as intended (e.g., when problems occur with the launching of the updated application). For a second example, such as when the modification is received from the community of users, the remote system(s) may verify whether the modifications are still authorized for the updated application. For instance, the developer of the application may initially specify whether the remote system(s) 104 are authorized to modify the updated application or whether the remote system(s) 104 are unauthorized to modify the updated application.

While the examples described above are directed to single player applications, in other examples, similar processes may be used to modify multiplayer applications. For example, and for a multiplayer gaming application, the remote system(s) 104 may perform the processes described above to modify the gaming application using a first modification for a first user and also perform the processes described above to modify the gaming application using a second modifications for a second user. In some examples, the first modification may be similar to the second modification while, in other examples, the first modification may be different than the second modification. When enabling modifications for multiplayer applications, the remote system(s) 104 may be more restrictive on the types of modifications that are allowed. For example, the remote system(s) 104 may allow certain types of modifications, such as modifications that change the appearances of characters, but not allow other types of modifications, such as modifications that change attributes of the characters.

Additionally, while the examples above describe enabling modifications before launching the application, in other examples, the modifications may be enabled after launching the application. For example, the remote system(s) 104 may perform the processes described herein in order to enable modifications for the application. After the application is then launched such that the user is controlling the application, the remote system(s) 104 (e.g., the virtual server 236) may allow the user to disable and reenable the modifications. For example, remote system(s) 104 may provide the user with functionality, such as a user interface, that the user is able to use to disable and reenable modifications. For instance, the user interface may include a list of the modification(s) for the application, information indicating whether the modification(s) are enabled or disabled, and interface element(s) that allow the user to disable or reenable the modification(s).

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the electronic device and one or more other remote systems, as well as other networked devices, such as using network(s) 244. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

As described above, the user-support component 210 may generate a user interface for selecting modifications, either to enable or to acquire. As such, FIG. 3 illustrates an example of a user interface 302 for selecting modifications for an application, in accordance with examples of the present disclosure. As shown, the user interface 302 may include application content 304. The application content 304 may include an image, a video, text, and/or the like representing content about the application. For example, if the application includes a gaming application, such as a sports game, then the application content 304 may include an image of a sports player and/or a sports arena that are related to the sports game. This way, the user is able to use the application content 304 to determine which application the user is about to select.

The user interface 302 may further include modifications 306(1)-(3) (also referred to as "modification 306") for selection by the user. While the example of FIG. 3 illustrates the user interface 302 as including three modifications 306, in other examples, the user interface 302 may include any number of modifications (e.g., one modification, two modifications, ten modifications etc.). In some examples, the portion of the user interface 302 for each modification may include information about the respective modification. For example, the portion of the user interface 302 for the modification 306(1) may include text describing the modification 306(1), an image illustrating the modification 306

(1), a price for acquiring the modification 306(1), and/or any other information. The user is then able to select one or more of the modifications 306 for the application. In some examples, the user selects the modification(s) 306 by selecting the portion(s) of the user interface 302 associated with the requested modification(s) 306.

The user interface 302 may further include an interface element 308 associated with starting the application. For instance, after selecting the modification(s) 306 that the user wants to enable for the application, the user may select the interface element 308. Based on receiving the input selecting the interface element 308, the user device 232 may send, to the remote system(s) 104, the request to play the application with the selected modification(s) 306.

In some examples, the user interface 302 may allow the user to search for modifications 306 using one or more criteria. For example, the user interface 302 may allow the user to search for modifications 306 based on categories for the modifications 306. In such examples, the categories may be based on different assets associated with the application. For instance, a first category may include first modifications associated with changing a character, a second category may include second modifications associated with changing an item for the character, a third category may include third modifications associated with changing attributes associated with the character, and/or so forth. This way, the user is able to quickly identify modifications that are associated with different assets of the application.

As described above, in some examples, the user may need to purchase a modification for a price. As such, FIG. 4 illustrates an example of a user interface 402 for acquiring a modification for an application, in accordance with examples of the present disclosure. As shown, the user interface 402 may include application content 404, which may be similar to the application content 304. For instance, the application content 404 may include an image, a video, text, and/or the like representing content about the application. For a first example, if the application includes a gaming application, such as a sports game, then the application content 404 may include an image of a sports player and/or a sports arena that are related to the sports game. For a second example, the application content 404 may include an image associated with the modification, similar to the modifications 306 described above.

The user interface 402 may further include a cost 406 associated with acquiring the modification. Additionally, the user interface 402 may include an interface element 408 that the user may use to input payment information for acquiring the modification. For example, the user device 232 may receive inputs associated with the interface element 408, where the inputs represent the payment information associated with the user.

The user interface 402 may further include an interface element 410 associated with proceeding with the transaction for the modification and an interface element 412 associated with canceling the transaction. For example, the user device 232 may receive an input selecting the interface element 410. Based on the input, the user device 232 may send, to the remote system(s) 104, a request to purchase the modification. The request may include at least an identifier of the application, an identifier of the modification, the price of the modification, the payment information, and/or any other information needed to conduct the transaction for the modification.

FIG. 5 illustrates examples of modifying an application, in accordance with examples of the present disclosure. As shown, a first illustration 502 shows the original content of the application. For instance, and in the example of FIG. 5, the application may include a gaming application, such as a baseball game. As such, original content may include a player that is wearing a plane uniform, holding a baseball bat, and hitting a baseball. However, the gaming application may allow for modifications to certain aspects of the gaming application. For example, a second illustration 504 shows a first modification for the gaming application, which includes changing the color of the baseball bat and baseball. A third illustration 506 shows a second modification for the gaming application, which includes changing the baseball bat to a cricket bat and changing the baseball to a cricket ball. Finally, a fourth illustration 508 shows a third modification for the gaming application, which includes changing the uniform to include a logo. While these are just a couple examples of modifications that may be applied to the gaming application, in other examples, additional and/or alternative modifications may be applied.

In the example of FIG. 5, the remote system(s) 104 may determine that the first modification and the second modification are incompatible with one another. This is because both the first modification and the second modification are associated with changing a same aspect (e.g., the baseball bat and the baseball) of the gaming application. As such, the remote system(s) 104 may notify a user that the user is only able to select the first modification or the second modification, but not both modifications for the gaming application. However, the user may still be able to select the third modification since the third modification is compatible with both the first modification and the second modification. This is because the third modification is associated with changing an aspect (e.g., the uniform) of the gaming application than the aspect associated with the first modification and the second modification.

FIG. 6A illustrates an example of modifying, on a virtual server 236, software associated with an application, in accordance with examples of the present disclosure. As shown, the application data 222 stored on the virtual storage device 224 may represent resources 602(1)-(9) (also referred to as "resources 602"). As described herein, the resources 602 may include, but are not limited to, files, software, registry keys, directories, services, scripts, protection software, programs, shader cache, and/or other resources associated with the application. During installation, at least a portion of the resources 602 may be installed onto the virtual server 236. However, after installation, one or more of the resources 602 may be altered using the modification data 226 stored on the virtual storage device 228.

For instance, at least the resource 602(4) and the resource 602(5) on the virtual server 236 may be replaced and/or altered by a resource 604(1) and a resource 602(2) associated with the modification, respectively. For a first example, the modification may include at least altering the software files, the file directories, the registry keys, the services, and/or any other resources represented by the resource 602(4) and the resource 602(5) using the resource 604(1) and the resource 602(2). Additionally, or alternatively, in some examples, the modification may include installing new software files, files directories, registry keys, and/or services for the application, where these new resources are represented by the resource 604(1) and the resource 604(2). Additionally, or alternatively, in some examples, the modification may include updating the launch script associated with the application, where the launch scrip is represented by the resource 602(4) and/or the resource 602(6). While these are just a couple example techniques of modifying the application, in other examples, the application may be modified using additional and/or alternative techniques.

Figure 6B:
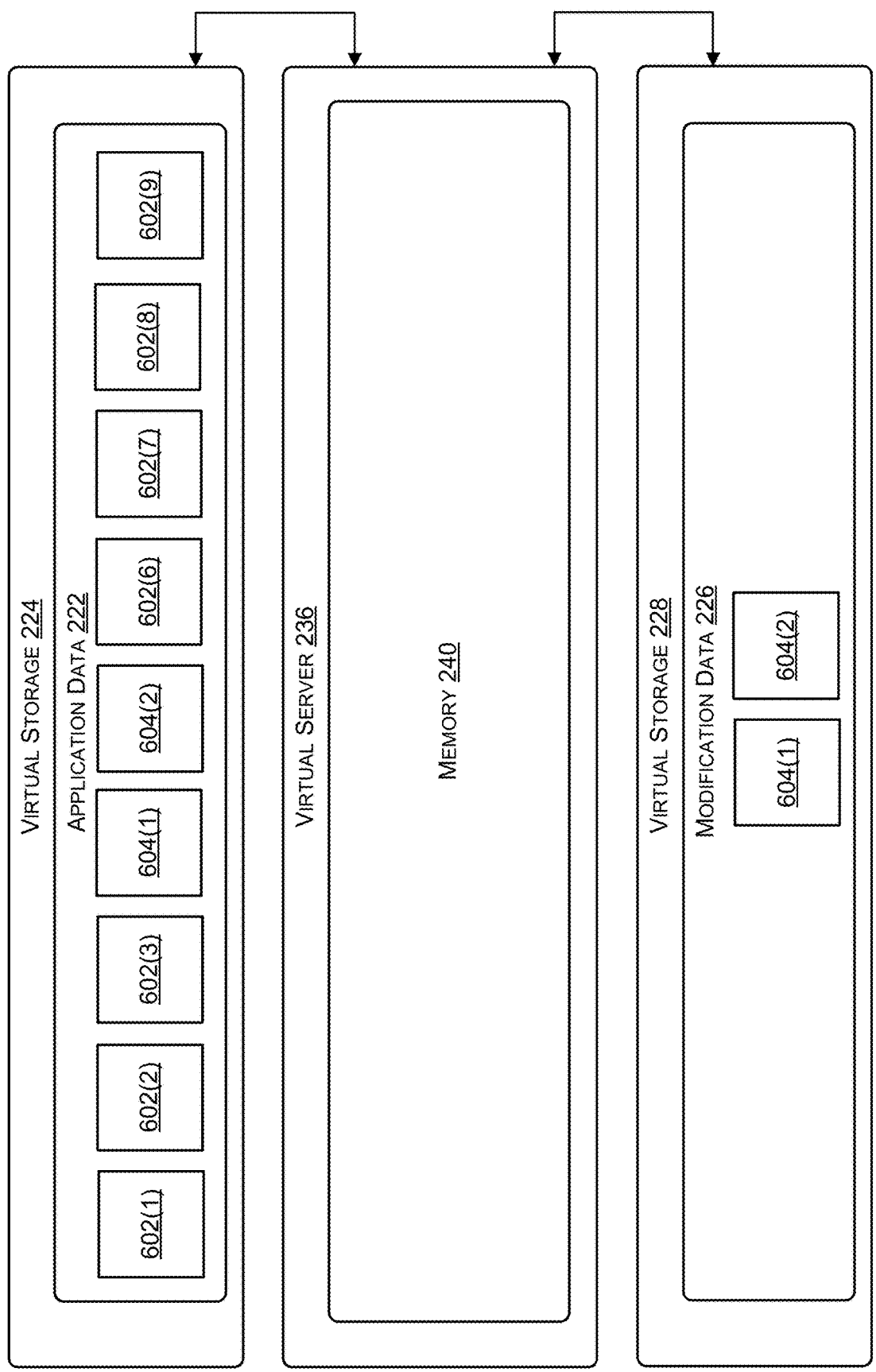
FIG. 6B illustrates an example of modifying, on a virtual storage device, software associated with an application, in accordance with examples of the present disclosure.

FIG. 6B illustrates an example of modifying, on a virtual storage device 224, software associated with an application, in accordance with examples of the present disclosure. In the example of FIG. 6B, the virtual storage device 224 and the virtual storage device 228 may again be associated with the virtual server 236, as represented by the arrows. However, in the example of FIG. 6B, the application stored on the virtual storage device 224 is modified using the modification.

For instance, at least the resource 602(4) and the resource 602(5) on the virtual storage device 224 may be replaced and/or altered by a resource 604(1) and a resource 602(2) associated with the modification, respectively. For a first example, the modification may include at least altering the software files, the file directories, the registry keys, the services, and/or any other resources represented by the resource 602(4) and the resource 602(5) using the resource 604(1) and the resource 602(2). Additionally, or alternatively, in some examples, the modification may include installing new software files, files directories, registry keys, and/or services for the application, where these new resources are represented by the resource 604(1) and the resource 604(2). Additionally, or alternatively, in some examples, the modification may include updating the launch script associated with the application, where the launch scrip is represented by the resource 602(4) and/or the resource 602(6). While these are just a couple example techniques of modifying the application, in other examples, the application may be modified using additional and/or alternative techniques.

FIGS. 7A-9 illustrate various processes for providing modified applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 7A:
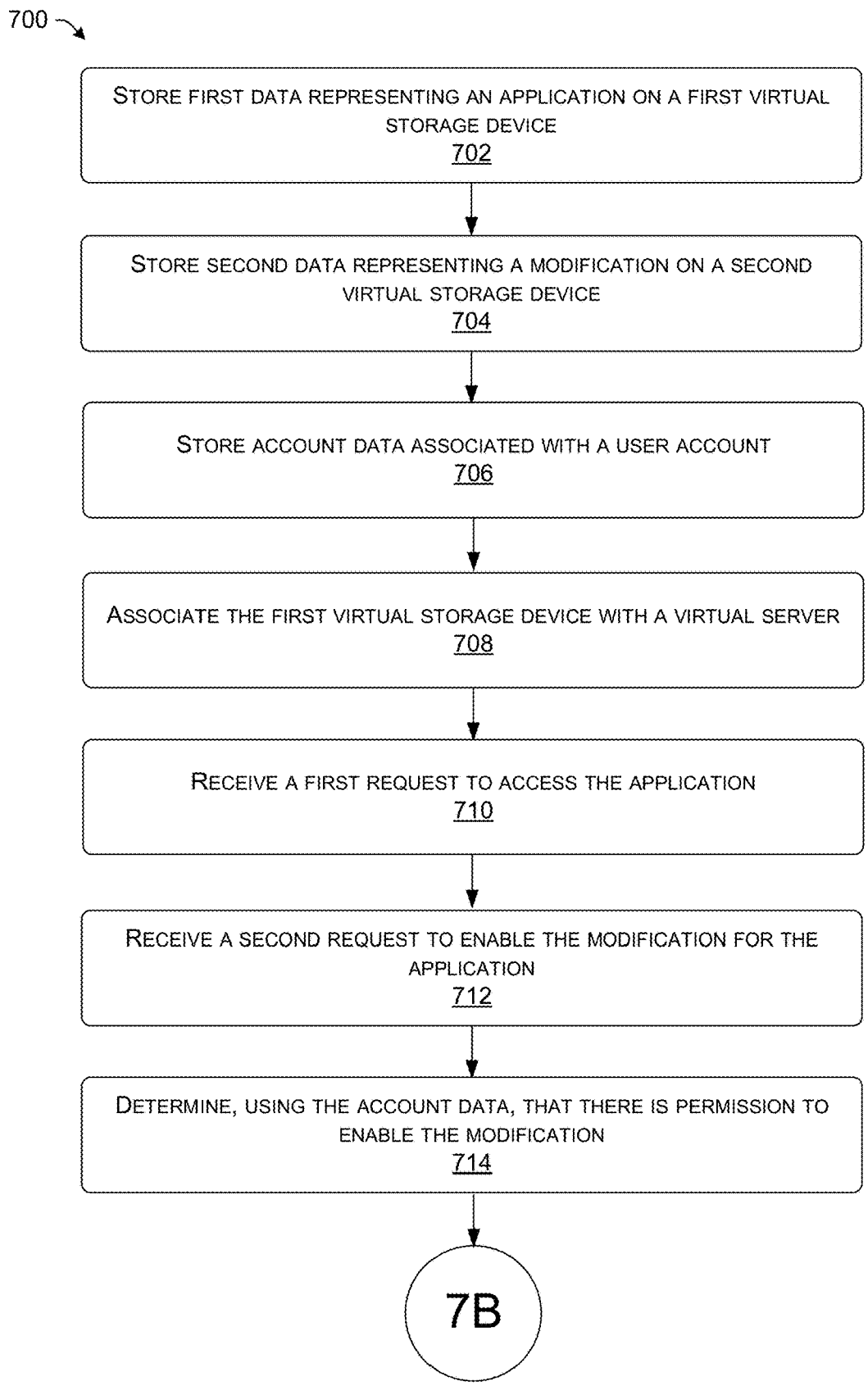
FIGS. 7A-7B illustrate an example process for providing a modified application, in accordance with examples of the present disclosure.
Figure 7B:
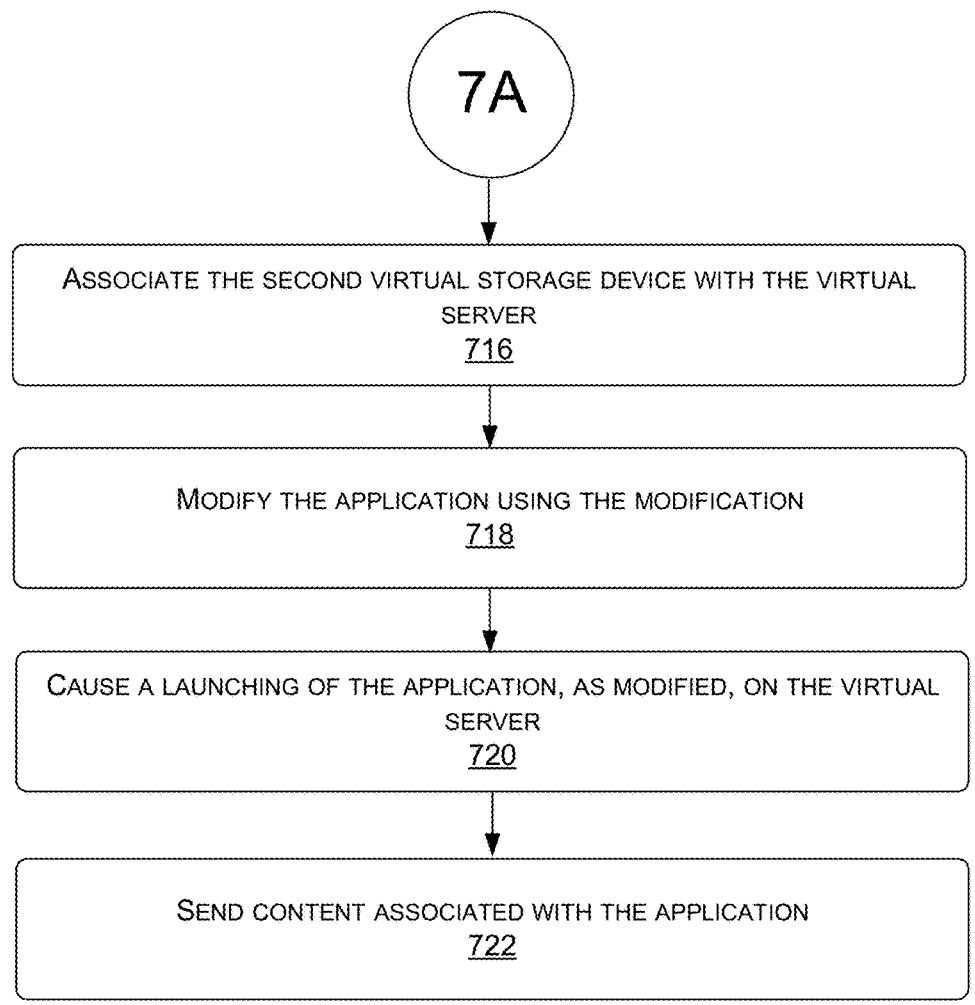

FIGS. 7A-7B illustrate an example process 700 for providing a modified application, in accordance with examples of the present disclosure. At 702, the process 700 may include storing first data representing an application on a first virtual storage device and at 704, the process 700 may include storing second data representing a modification on a second virtual storage device. For instance, the remote system(s) 104 may store the first data representing the application on the first virtual storage device. Additionally, the remote system(s) may store the second data representing the modification for the application on the second virtual storage device. As described herein, the remote system(s) 104 may receive the modification from a developer, such as a developer of the application and/or a developer associated with a community of users. The remote system(s) 104 may then verify the modification for the application, using one or more of the processes described herein.

At 706, the process 700 may include storing account data associated with a user account. For instance, the remote system(s) 104 may store the account data associated with the user account. The account data may represent information about the user account, such as an identifier of the user (e.g., a username, etc.), credentials for accessing the user account (e.g., a password, biometric data, etc.), an identifier of a user device, an identifier of a display device, application(s) that the user is entitled to access, modification(s) that the user is entitled to enable, payment information, user preferences, and/or any other information. In some examples, the remote system(s) 104 update the account data as the user acquires new application(s) and/or modification(s).

At 708, the process 700 may include associating the first virtual storage device with a virtual server. For instance, the remote system(s) 104 may associate (e.g., attach) the first virtual storage device with the virtual server. In some examples, based on associating the first virtual storage device with the virtual server, the application may be installed on the virtual server. For instance, the attaching of the first virtual storage device to the virtual server may cause an install script to execute, where the install script causes the application to be installed from the first virtual storage device onto the virtual server. In some examples, the remote system(s) 104 may further associate additional virtual storage devices, that also store the first data representing the application, with additional virtual servers. In other words, the remote system(s) 104 may create numerous instances of the application that users are able to access via the remote system(s) 104.

At 710, the process 700 may include receiving a first request to access the application. For instance, the remote system(s) 104 may generate a user interface that includes a list of applications that are provided by the remote system(s) 104. For example, the user interface may include identifiers (e.g., names) of the applications, images representing content from the applications, information describing the applications, and/or the like. The remote system(s) 104 may then send, to the user device, user interface data representing the user interface. A user of the user device may then view the user interface and select the application. In response, and in some examples, the remote system(s) 104 may receive, from the user device, input data representing the selection of the application. Additionally, or alternatively, in some examples, the remote system(s) 104 may receive, from the user device, identifier data representing the identifier of the application. In either example, the remote system(s) 104 may then identify the application using the data.

At 712, the process 700 may include receiving a second request to enable the modification for the application. For instance, the remote system(s) 104 may generate a user interface that includes a list of modifications that are available for the application. For example, the user interface may include identifiers (e.g., names) of the modifications, images representing how the modification will alter the application, information describing the modifications, and/or the like. The remote system(s) 104 may then send, to the user device, user interface data representing the user interface. A user of the user device may then view the user interface and select the modification. In response, and in some examples, the remote system(s) 104 may receive, from the user device, input data representing the selection of the modification. Additionally, or alternatively, in some examples, the remote system(s) 104 may receive, from the user device, identifier data representing the identifier of the modification. In either example, the remote system(s) 104 may then identify the modification using the data.

At 714, the process 700 may include determining, using the account data, that there is permission to enable the modification and at 716, the process 700 may include associating the second virtual storage device with the virtual server. For instance, the remote system(s) 104 may use the account data to determine that the user has permission to enable the modification. In some examples, the remote system(s) 104 may make the determination based on the account data indicating that the user has acquired the modification. For instance, the remote system(s) 104 may determine that the account data is associated with identifier data for the modification. Based on the determination, the remote system(s) 104 may associate the second virtual storage device with the virtual server.

At 718, the process 700 may include modifying the application using the modification. For instance, the remote system(s) 104 may modify the application using the modification, such as by executing a launch script associated with the modification. As described herein, in some examples, modifying the application may include at least altering the software files, the file directories, the registry keys, the services, and/or any other resource of the first data representing the application on the first virtual storage device and/or the virtual server. Additionally, or alternatively, in some examples, modifying the application may include installing new software files, files directories, registry keys, and/or services for the application on the first virtual storage device and/or the virtual server, where these new resources are represented by the second data. Additionally, or alternatively, in some examples, modifying the application may include updating the launch script associated with the application on the first virtual storage device and/or the virtual server, where the launch scrip represents at least rules, processes, commands, and/or the like for launching the application on the virtual server.

At 720, the process 700 may include causing a launching of the application, as modified, on the virtual server and at 722, the process may include sending content associated with the application. For instance, once the modification has been installed on the first virtual storage device and/or the virtual server, the remote system(s) 104 may cause the application to launch on the virtual server. In some examples, the remote system(s) 104 cause the launching using the launch script associated with the application. The remote system(s) 104 may then assign the user device (and/or a separate display device) to the virtual server so that the user may control the application. For instance, the virtual server may receive input data from the user device, updates states of the application using the input data, and then send content representing the states of the application to the user device (and/or the separate display device.

Figure 8:
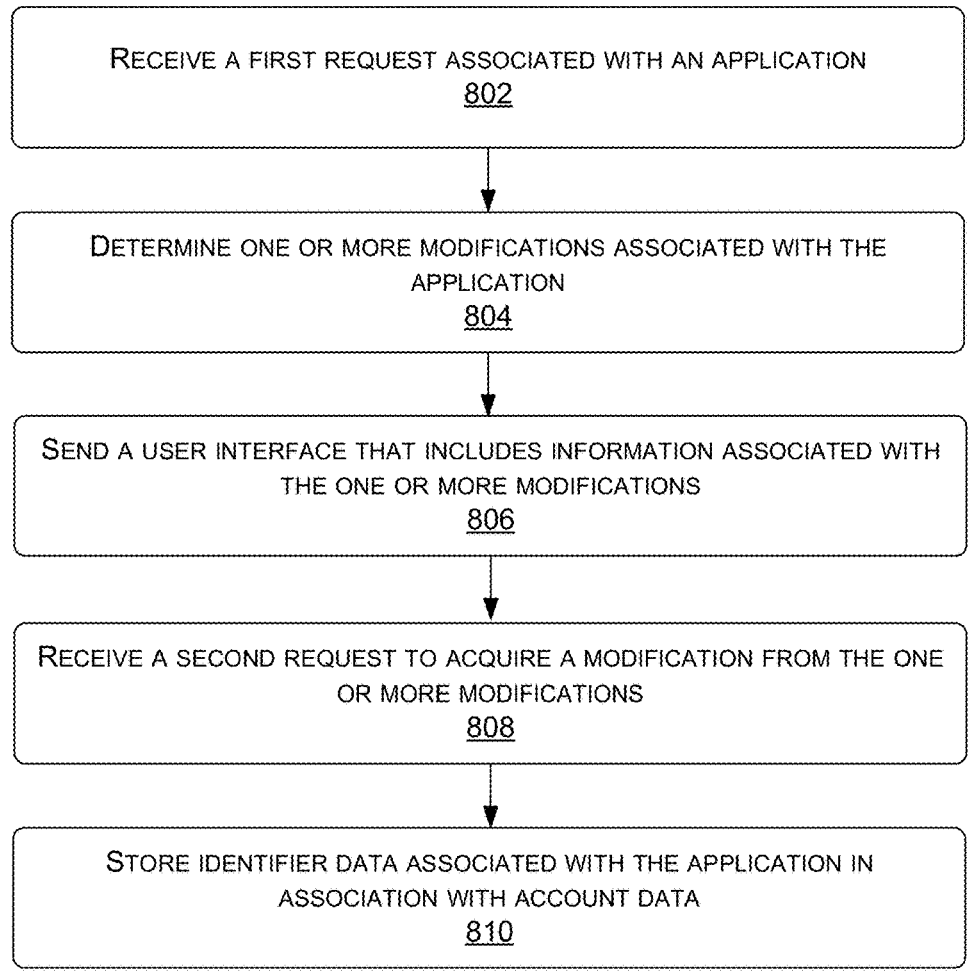
FIG. 8 illustrates an example process for acquiring a modification for an application, in accordance with examples of the present disclosure.

FIG. 8 illustrates an example process 800 for acquiring a modification for an application, in accordance with examples of the present disclosure. At 802, the process 800 may include receiving a first request associated with an application and at 804, the process 800 may include determining one or more modifications associated with the application. For instance, the remote system(s) 104 may receive, from a user device, the first request associated with the application. In some examples, such as when the application is a gaming application, the first request may be to play the gaming application. The remote system(s) 104 may then determine whether the application is enabled for modification(s). Additionally, if the remote system(s) 104 determine that the application is enabled for modification(s), the remote system(s) 104 may determine the modification(s) associated with the application. In some examples, the remote system(s) 104 may determine the modification(s) using a catalogue that includes the modification(s) for the application.

At 806, the process 800 may include sending a user interface that includes information about the one or more modifications. For instance, the remote system(s) 104 may send, to the user device, user interface data representing the user interface. The user interface may include the information describing the modification(s). For example, and for a given modification, the user interface may include text describing the modification, an image illustrating the modification, a price for acquiring the modification, and/or any other information. In some examples, the user interface may further include an interface element that the user may use to input payment information for acquiring the modification.

At 808, the process 800 may include receiving a second request to acquire a modification from the one or more modifications. For instance, the remote system(s) 104 may receive, from the user device, the second request to acquire the modification from the modification(s). In some examples, such as when the modification is acquired for a price, the second request may further include payment information for acquiring the modification. Additionally, or alternatively, in some examples, and again when the modification is acquired for a price, the remote system(s) 104 may retrieve the payment information from a user account associated with the user. In either of the examples, the remote system(s) 104 may then process a transaction for the price of the modification using the payment information.

At 810, the process 800 may include storing identifier data associated with the application in association with account data. For instance, once the user has acquired the application, the remote system(s) 104 may store the identifier data in association with the account data. This way, the remote system(s) 104 are able to later determine that the user has acquired the modification and that the user may enable the modification for the application. Additionally, once the modification has been acquired, the user may enable the modification when using the application.

Figure 9:
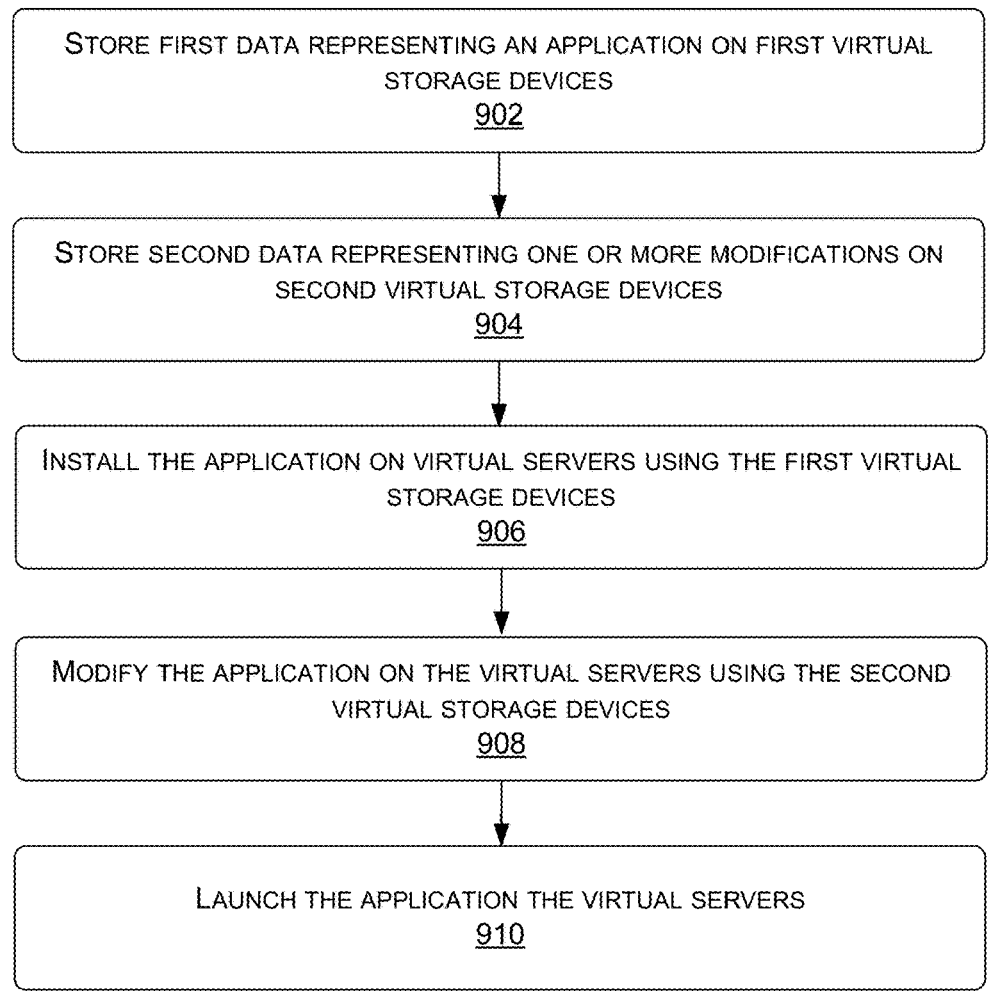
FIG. 9 illustrates an example process for modifying an application on virtual servers, in accordance with examples of the present disclosure.

FIG. 9 illustrates an example process 900 for modifying an application on virtual servers, in accordance with examples of the present disclosure. At 902, the process 900 may include storing first data representing an application on first virtual storage devices and at 904, the process 900 may include storing second data representing one or more modifications on second virtual storage devices. For instance, the remote system(s) 104 may store the first data representing the application on the first virtual storage devices. The remote system(s) 104 may also store the second data representing the modification(s) on the second virtual storage devices. In some examples, at least some of the first virtual storage devices include the second virtual storage devices while, in other examples, the first virtual storage devices are separate from the second virtual storage devices. Additionally, in some examples, different modifications are stored on different second virtual storage devices while, in other examples, different modifications are stored on the same second virtual storage devices.

At 906, the process 900 may include installing the application on virtual servers using the first virtual storage devices. For instance, the remote system(s) 104 may use the first virtual storage devices to install the application on the virtual servers. In some examples, to install the application on a virtual server, the remote system(s) 104 may "attach" the first virtual storage device to the virtual server. The remote system(s) 104 may then execute an install script that installs the application on the virtual server.

At 908, the process 900 may include modifying the application on the virtual servers using the second virtual storage devices. For instance, the remote system(s) 104 may modify the application on the virtual servers using the second virtual storage devices. In some examples, to modify an application, the remote system(s) 104 may "attach" the second virtual storage device to the virtual server. The remote system(s) 104 may then execute a launch script associated with the modification, which may cause the modification to launch on the virtual server and, as such, modify the application. In some examples, the remote system(s) 104 modify the application on the virtual servers using different modifications. In some examples, the remote system(s) 104 modify the application on a single server using more than one modification. Still, in some examples, the remote system(s) 104 modify the application based on receiving requests from users to enable the modifications.

At 910, the process 900 may include launching the application on the virtual servers. For instance, after the application is modified on the virtual servers, the remote system(s) 104 may cause the launching of the application on the virtual servers. In some examples, the remote system(s) 104 cause the launching using a launch script associated with the application. In some examples, after launching the application, the remote system(s) 104 may assign user devices to the virtual servers. For example, the remote system(s) 104 may receive a first request from a first user device to enable a first modification for the application and a second request from a second user device to enable a second modification for the application. As such, the remote system(s) 104 may assign the first user device to a first virtual server that launched the application with the first modification and assign the second user device to a second virtual server that launched the application using the second modification.

Figure 10:
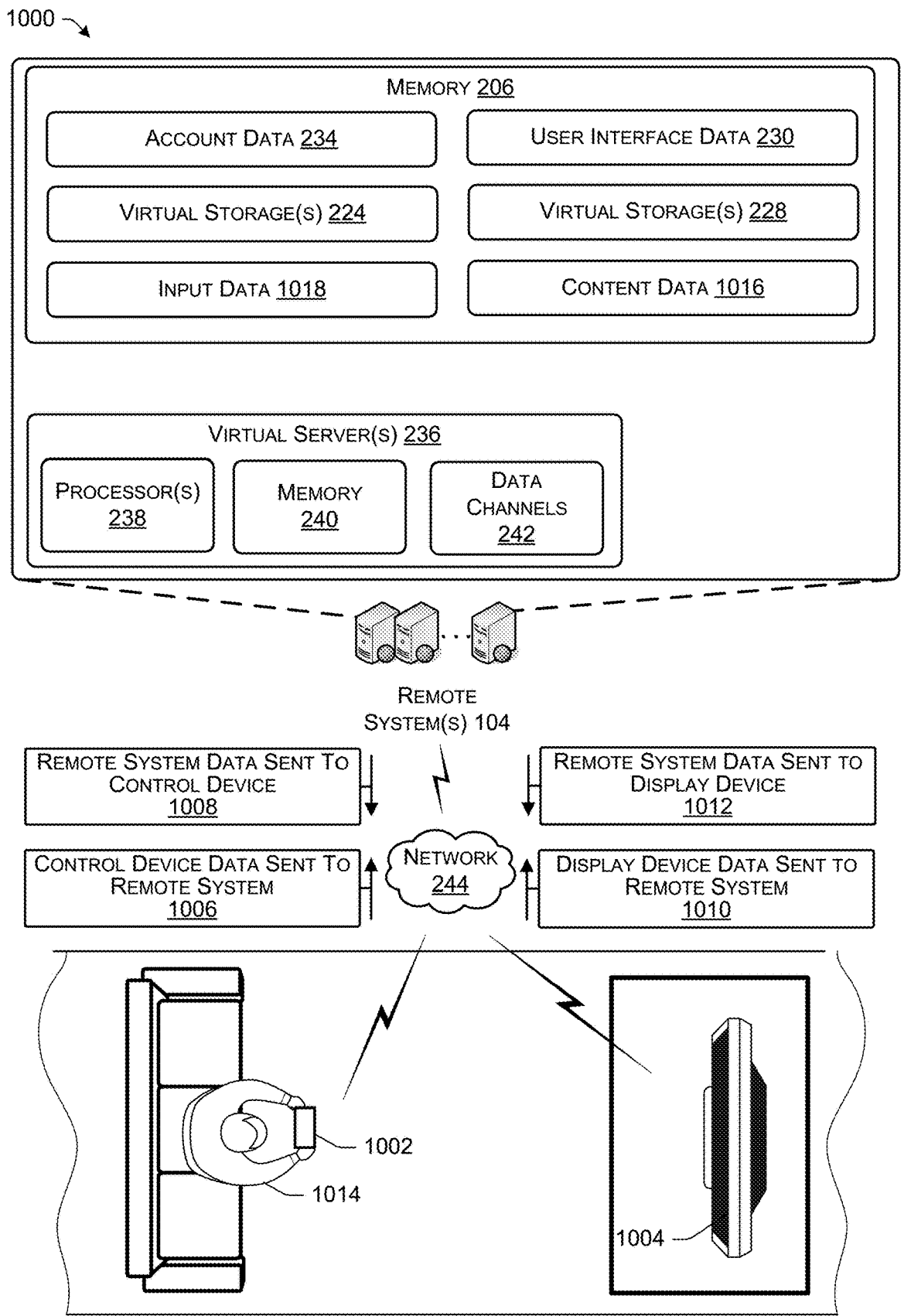
FIG. 10 illustrates a schematic diagram of an example system for controlling network applications, in accordance with examples of the present disclosure.

FIG. 10 is a schematic diagram of an example system 1000 for controlling network applications, in accordance with examples of the present disclosure. The system 1000 may include, for example, the remote system(s) 104, a control device 1002, and a display device 1004. In the example of FIG. 10, the control device 1002 may communicate with the remote system(s) 104 over the network(s) 244, such as by using a first communication channel. For instance, the control device 1002 may send data to the remote system(s) 104 (which is represented by 1006) and the remote system(s) 104 may send data to the control device 1002 (which is represented by 1008). Additionally, the display device 1004 may communicate with the remote system(s) 104 over the network(s) 244, such as by using a second communication channel. For instance, the display device 1004 may send data to the remote system(s) 104 (which is represented by 1010) and the remote system(s) 104 may send data to the display device 1004 (which is represented by 1012).

By sending and receiving data with the control device 1002 and the display device 1004, the remote system(s) 104 allow a user 1014 to control, via the remote system(s) 104, the application being displayed by the display device 1004 using the control device 1002. For instance, the control device 1002 may connect to the network(s) 244, such as by using configuration settings. The control device 1002 may then send, to the remote system(s) 104, identifier data representing at least an identifier associated with the control device 1002. The remote system(s) 104 may receive the data and determine, using account data 234, that the data is received from the control device 1002. For example, the remote system(s) 104 may match the identifier represented by the data received from the control device 1002 with an identifier associated with the account data 234. Based at least in part on the match, the remote system(s) 104 may determine that the data was sent from the control device 1002.

The remote system(s) 104 may further determine, using the account data 234, that the control device 1002 is associated with at least the display device 1004. For example, and based at least in part on determining that the data was sent from the control device 1002, the remote system(s) 104 may analyze the account data 234 associated with the user 1014. The remote system(s) 104 may then determine that the account data 234 includes and/or is associated with data representing an identifier of the display device 1004. Based at least in part on the determination, the remote system(s) 104 may determine that the control device 1002 is associated with the display device 1004.

In some instances, the remote system(s) 104 may then send, to the display device 1004, content data 1016 (e.g., video data, audio data, etc.) representing one or more applications that are available to the user 1014. In some instances, the one or more applications may include one or more applications that have been acquired by the user 1014 (e.g., the one or more applications associated with the account data 234). Additionally, or alternatively, in some instances, the one or more applications may include one or more applications that are free to users. In either example, the display device 1004 may receive the content data 1016 from the remote system(s) 104. The display device 1004 may then display image(s) that represent the one or more applications that are available to the user 1014. For example, the image(s) may include one or more identifiers (e.g., one or more names) of the one or more applications that are available to the user 1014.

The remote system(s) 104 may then receive, from the control device 1002, input data 1018 representing input(s) received by the control device 1002. The remote system(s) 104 may analyze the input data 1018 to identify an application that is selected by the user 1014. For example, the input(s) may correspond to movement(s) of an object, such as a cursor, across the image(s) representing the one or more applications. The input(s) may further correspond to a selection of one of the applications (e.g., a selection of a control on the control device 1002 when the object is located over the selected application). The remote system(s) 104 may then determine, based at least in part on the selection, that the user 1014 selected the application.

The remote system(s) 104 may then assign the control device 1002 and/or the display device 1004 with a virtual server 236 associated with the application. Additionally, the remote system(s) 104 may perform the processes described herein in order to install, modify, and launch the application on the virtual server 236. In some examples, the launching of the application occurs using the launch file that includes the command(s) associated with launching the application. Once the application is launched, the remote system(s) 104 are able to provide content associated with the application.

For example, the remote system(s) 104 may then send, to the display device 1004, content data 1016 representing a first state of the application. The content data 1016 may include first video data representing image(s) of the first state of the application, first audio data representing sound corresponding to the first state of the application, and/or first timestamp data representing a time for displaying the image (s) and/or a time for outputting the sound. The display device 1004 may receive the content data 1016 from the remote system(s) 104. Using the first video data, the display device

1004 may display the image(s) representing the first state of the application. For example, if the application includes a gaming application, the display device 1004 may display content representing the first state of the game. In the example of FIG. 10, the first state of the game may include an object (e.g., a character) located at a first position in a gaming environment (e.g., a forest). In some instances, the display device 1004 may further output the sound represented by the first audio data.

In some instances, the display device 1004 displays the image(s) and/or outputs the sound according to the time(s) represented by the first timestamp data. For example, the display device 1004 may determine when a current time includes the time represented by the first timestamp data for displaying the first video data. Based at least in part on the determination, the display device 1004 may begin displaying the image(s) representing the first state of the application. Additionally, the display device 1004 may determine when a current time includes the time represented by the first timestamp data for outputting the sound. Based at least in part on the determination, the display device 1004 may begin outputting the sound represented by the first audio data.

In some instances, the remote system(s) 104 may additionally send, to the control device 1002, content data 1016 representing the first state of the application. The content data 1016 may include second audio data representing sound corresponding to the first state of the application and/or second timestamp data representing a time for outputting the sound. The control device 1002 may then output the sound represented by the second audio data. In some instances, the control device 1002 may output the sound according to the time represented by the second timestamp data. In some instances, first timestamp data and/or the second timestamp data synchronizes the outputting of the sound by the control device 1002 with the displaying of the image(s) by the display device 1004.

The user 1014 can then use the control device 1002 to provide inputs to the application. For instance, the control device 1002 may receive an input, such as a selection of a button, joystick, key, touch-sensitive pad, sensor, and/or the like associated with the control device 1002. The control device 1002 may then send, to the remote system(s) 104, input data 1018 representing the input. Using the input data 1018, the remote system(s) 104 may update the first state of the application to a second state of the application. For example, and using the example above where the application includes the gaming application, the input may be associated with moving the object forward by a given amount within the gaming environment. As such, the remote system(s) 104 may analyze the input data 1018 to determine that the input includes moving the object forward by the given amount. The remote system(s) 104 may then update the first state of the of the application to the second state of the application by moving the object forward in the environment by the given amount.

The remote system(s) 104 may then send content data 1016 representing a second state of the application to the display device 1004. The content data 1016 may include third video data representing image(s) of the second state of the application, third audio data representing sound corresponding to the second state of the application, and/or third timestamp data representing a time for displaying the image(s) and/or a time for outputting the sound. The display device 1004 may receive the content data 1016 from the remote system(s) 104. Using the third video data, the display device 1004 may display image(s) representing the second state of the application. For example, and again using the example where the application includes the gaming application, the display device 1004 may display the object located at the second position within the gaming environment. In some instances, the display device 1004 may further output the sound represented by the third audio data. In some instances, the display device 1004 displays the image(s) and/or outputs the sound according to the time(s) represented by the third timestamp data.

In some instances, the remote system(s) 104 may additionally send, to the control device 1002, content data 1016 representing the second state of the application. The content data 1016 may include fourth audio data representing sound corresponding to the second state of the application and/or fourth timestamp data representing a time for outputting the sound. The control device 1002 may then output the sound represented by the fourth audio data. In some instances, the control device 1002 may output the sound according to the time represented by the fourth timestamp data. In some instances, third timestamp data and/or the fourth timestamp data synchronizes the outputting of the sound by the control device 1002 with the displaying of the image(s) by the display device 1004.

In some instances, the remote system(s) 104 may continue to receive input data 1018 from the control device 1002. The remote system(s) 104 may then continue to process the input data 1018 in order to update the state of the application. Based at least in part on the updating, the remote system(s) 104 may continue to send, to the display device 1004, content data 1016 (e.g., video data, audio data, timestamp data, etc.) representing the current state of the application. The remote system(s) 104 may further send, to the control device 1002, content data 1016 (e.g., audio data, timestamp data, etc.) representing the current state of the application. In other words, the remote system(s) 104 allow the user 1014 to access the application that is executing on the virtual server 236.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the one or more processors to perform operations comprising:
storing, on a first virtual storage device, first software data associated with a game;

generating second software data, wherein the second software data is associated with a list of modifications for the game;

storing, on a second virtual storage device, the second software data associated with the list of modifications for the game, individual ones of the modifications within the list of modifications associated with changing an aspect of the game;

storing account data associated with a user account;

associating the first virtual storage device with a virtual server, the virtual server for creating an instance of the game;

receiving, from a gaming controller and over a wireless network, a first request to play the game;

determining that the gaming controller is associated with the account data;

receiving, from the gaming controller and over the wireless network, a second request to modify the game using at least one of the individual ones of the modifications within the list of modifications;

determining that the user account includes permission to utilize the at least one of the individual ones of the modifications within the list of modifications;

based at least in part on the permission, associating the second virtual storage device with the virtual server;

generating third software data, the third software data associated with the game, the third software data representing the first software data as modified by the at least one of the individual ones of the modifications within the list of modifications;

storing the third software data on the first virtual storage device;

updating the list of modifications to include a reference to the third software data;

launching the third software data on the virtual server; and sending, to a display device associated with the gaming controller, and over the wireless network, content data representing the third software data.

2. The system as recited in claim 1, the operations further comprising:

sending, to the display device and over the wireless network, a user interface that includes at least:

an image associated with the game;

an image associated with the list of modifications for the game; and an option to select the individual ones of the modifications within the list of modifications, wherein receiving the second request to modify the game comprises receiving, from the gaming controller and over the wireless network, input data representing a selection of the option.

3. The system as recited in claim 1, the operations further comprising:

receiving, from the gaming controller and over the wireless network, a third request to modify the game; and based at least in part on the third request, storing, in association with the account data, identifier data representing:

the at least one of the individual ones of the modifications within the list of modifications, and wherein determining that the user account has permission to utilize the at least one of the individual ones of the modifications within the list of modifications is based at least in part on the identifier data being stored in association with the account data.

4. A method comprising:

storing first data associated with a game;

generating second data, wherein the second data is associated with a list of modifications for the game;

storing second data associated with the list of modifications for the game, individual ones of the modifications within the list of modifications associated with changing an aspect of the game;

associating the first data with a virtual server;

receiving, from a user device and over a wireless network, a request to play the game;

based at least in part on receiving the request, determining to modify the game utilizing at least one of the individual ones of the modifications within the list of modifications;

generating third data, wherein the third data is associated with the game, the third data representing the first data as modified by the at least one of the individual ones of the modifications within the list of modifications;

storing the third data;

updating the list of modifications to include a reference to the third data; and launching the third data on the virtual server.

5. The method as recited in claim 4, wherein generating the third data comprises storing a file represented by the second data in a file directory represented by the first data.

6. The method as recited in claim 4, wherein generating the third data comprises updating a file represented by the first data using the second data.

7. The method as recited in claim 4, wherein:

launching the third data comprises executing a first launch script represented by the second data; and launching the third data on the virtual server comprises, after executing the first launch script represented by the second data, executing a second launch script represented by the first data.

8. The method as recited in claim 4, wherein:

storing the first data associated with the game comprises storing the first data associated with the game on a first virtual storage device;

storing the second data associated with the list of modifications comprises storing the second data associated with the list of modifications on a second virtual storage device;

associating the first data with the virtual server comprises associating the first virtual storage device with the virtual server, the virtual server associated with an instance of the game; and the method further comprises, based at least in part on determining to generate the third data, associating the second virtual storage device with the virtual server.

9. The method as recited in claim 8, wherein generating third data comprises modifying the first data stored on the first virtual storage device using the second data.

10. The method as recited in claim 8, further comprising:

installing the first data on the virtual server using the first virtual storage device, and wherein generating third data comprises modifying the first data stored on the virtual server using the second data.

11. The method as recited in claim 4, further comprising:

generating account data representing a user account;

storing the account data representing the user account;

receiving, from the user device and over the wireless network, a request to acquire the at least one of the individual ones of the modifications within the list of modifications; and based at least in part on receiving the request to acquire the at least one of the individual ones of the modifications within the list of modifications, storing, in association with the account data, identifier data associated with the at least one of the individual ones of the modifications within the list of modifications.

12. The method as recited in claim 4, further comprising:
generating account data representing a user account;
storing the account data representing the user account;
storing, in association with the account data, identifier data associated with the at least one of the individual ones of the modifications within the list of modifications;
determining that the user device is associated with the account data;
determining, based at least in part on the identifier data, that the user account includes permission to utilize the third data, wherein determining to modify the game using the at least one of the individual ones of the modifications within the list of modifications is based at least in part on the user account including permission to utilize the at least one of the individual ones of the modifications within the list of modifications.

13. The method as recited in claim 4, further comprising:
sending, to at least one of the user device or a display device, and over the wireless network, a user interface that includes at least:
an image associated with the game;
an image associated with the list of modifications for the game; and
an option to select the individual ones of the modifications within the list of modifications, wherein determining to modify the game using the at least one of the individual ones of the modifications within the list of modifications comprises receiving, from the user device and over the wireless network, input data representing a selection of the option.

14. The method as recited in claim 13, wherein the at least one of the individual ones of the modifications within the list of modifications is a first modification, and wherein the method further comprises:
generating account data representing a user account;
storing the account data representing the user account;
determining, based at least in part on the account data, that the user account includes permission to utilize the first modification;
determining, based at least in part on the account data, that the user account includes permission to utilize a second modification for the game; and
generating the user interface, the user interface further including an option to select the second modification for the game.

15. The method as recited in claim 4, further comprising receiving, from one or more computing devices and over the wireless network, the second data associated with the list of modifications for the game, the second data representing at least:
one or more files;
software; and
a launch script.

16. The method as recited in claim 15, further comprising receiving, from the one or more computing devices and over the wireless network, at least one of:
first identifier data associated with the game;
second identifier data associated with the at least one of the individual ones of the modifications within the list of modifications;
image data representing the at least one of the individual ones of the modifications within the list of modifications;
text data representing a description of the at least one of the individual ones of the modifications within the list of modifications; or
a price associated with acquiring the at least one of the individual ones of the modifications within the list of modifications.

17. The method as recited in claim 4, wherein the virtual server is a first virtual server, and wherein the method further comprises:
storing fourth data associated with the game;
generating fifth data, wherein the fifth data is associated with the list of modifications for the game;
storing the fifth data associated with the modification for the game;
associating the fourth data with a second virtual server;
generating sixth data, wherein the sixth data is associated with the game, the sixth data representing the fourth data as modified at least by the fifth data;
launching the sixth data on the second virtual server; and
determining that the sixth data is verified based at least in part on launching the sixth data on the second virtual server.

18. The method as recited in claim 4, wherein the at least one of the individual ones of the modifications within the list of modifications includes changing an aspect of the game, the aspect including at least one of:
a character of the game;
an appearance of the character of the game;
an attribute associated with the character;
an object of the game;
an appearance of the object of the game;
a behavior associated with the object;
a difficulty associated with the game; or
an environment of the game.

19. The method as recited in claim 4, further comprising:
sending, to at least one of the user device or a display device, and over the wireless network, first content representing a first state of the game;
receiving, from the user device and over the wireless network, input data associated with the game;
determining a second state of the game based at least in part on the first state of the game and the input data; and
sending, to at least one of the user device or the display device, and over the wireless network, second content representing the second state of the game.

20. A system comprising:
one or more processors; and
one or more computer-readable media storing instructions that, when executed by the one or more processors, cause the one or more processors to perform operations comprising:
storing first data associated with a game;
generating second data, wherein the second data is associated with a list of modifications for the game;
storing second data associated with the list of modifications for the game, individual ones of the modifications within the list of modifications associated with changing an aspect of the game;
associating the first data with a virtual server;
receiving, from a user device and over a wireless network, a request to play the game;

based at least in part on receiving the request, determining to modify the game utilizing at least one of the individual ones of the modifications within the list of modifications;

generating third data, wherein the third data is associated with the game, the third data representing the first data as modified by the at least one of the individual ones of the modifications within the list of modifications;

storing the third data;

updating the list of modifications to include a reference to the third data; and launching the third data on the virtual server.

* * * * *